United States Patent
Marcinkiewicz et al.

(10) Patent No.: US 11,710,495 B2
(45) Date of Patent: Jul. 25, 2023

(54) DEVICE FOR OUTPUTTING SOUND AND METHOD THEREFOR

(71) Applicant: Samsung Electronics Co., Ltd., Suwon-si (KR)

(72) Inventors: Piotr Marcinkiewicz, Wolomin (PL); Grzegorz Pawel Grzesiak, Warsaw (PL); Jakub Tkaczuk, Rumia (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 17/255,077

(22) PCT Filed: Jun. 28, 2019

(86) PCT No.: PCT/KR2019/007871
§ 371 (c)(1),
(2) Date: Dec. 22, 2020

(87) PCT Pub. No.: WO2020/009378
PCT Pub. Date: Jan. 9, 2020

(65) Prior Publication Data
US 2021/0264932 A1    Aug. 26, 2021

(30) Foreign Application Priority Data
Jul. 3, 2018 (KR) .................. 10-2018-0077318

(51) Int. Cl.
*G10L 21/028*   (2013.01)
*G06F 3/16*     (2006.01)
(Continued)

(52) U.S. Cl.
CPC ............ *G10L 21/028* (2013.01); *G06F 3/165* (2013.01); *G10L 15/22* (2013.01); *G10L 15/30* (2013.01);
(Continued)

(58) Field of Classification Search
CPC ....... G10L 21/028; G10L 15/22; G10L 15/30; G10L 25/51; G10L 25/30; G06F 3/165; H04R 3/04
See application file for complete search history.

(56) References Cited

U.S. PATENT DOCUMENTS 8,761,406 B2   6/2014  Ohkuri et al.
9,324,322 B1   4/2016  Torok et al.
(Continued)

FOREIGN PATENT DOCUMENTS

CN    1965218 A       5/2007
JP    2006-171077 A   6/2006
(Continued)

OTHER PUBLICATIONS

Chinese Office Action dated Mar. 22, 2022, issued in a counterpart Chinese Application No. 201980044603.2.
(Continued)

*Primary Examiner* — Mohammad K Islam
(74) *Attorney, Agent, or Firm* — Jefferson IP Law, LLP

(57) ABSTRACT

A device for outputting sound and a method therefor are provided. The sound output method includes predicting external sound to be received from an external environment, variably adjusting sound to be output from the device, based on the predicted external sound, and outputting the adjusted sound.

13 Claims, 22 Drawing Sheets

(51) Int. Cl.
   *G10L 15/22* (2006.01)
   *G10L 15/30* (2013.01)
   *G10L 25/51* (2013.01)
   *H04R 3/04* (2006.01)
   *G10L 25/30* (2013.01)

(52) U.S. Cl.
   CPC ............... *G10L 25/51* (2013.01); *H04R 3/04* (2013.01); *G10L 25/30* (2013.01)

(56) References Cited

U.S. PATENT DOCUMENTS

| | | | |
|---|---|---|---|
| 9,412,356 B1* | 8/2016 | Baker | G10K 11/17855 |
| 9,251,787 B1 | 9/2016 | Hart et al. | |
| 9,633,661 B1 | 4/2017 | Typrin et al. | |
| 10,147,442 B1* | 12/2018 | Panchapagesan | G06N 3/04 |
| 10,529,358 B2* | 1/2020 | Jackson | G10K 11/17821 |
| 11,210,461 B2* | 12/2021 | Thomson | G10L 15/22 |
| 11,218,796 B2 | 1/2022 | Klimanis | H04R 1/1083 |
| 2005/0102142 A1 | 5/2005 | Soufflet et al. | |
| 2009/0187402 A1 | 7/2009 | Scholl | |
| 2010/0105447 A1 | 4/2010 | Sibbald et al. | |
| 2013/0314352 A1 | 11/2013 | Zhai et al. | |
| 2014/0079261 A1* | 3/2014 | Short | H04R 25/50 381/317 |
| 2014/0301569 A1* | 10/2014 | Every | H04R 3/04 381/103 |
| 2014/0341388 A1* | 11/2014 | Goldstein | G10K 11/17827 381/71.11 |
| 2015/0095026 A1 | 4/2015 | Bisani et al. | |
| 2015/0170645 A1 | 6/2015 | Di Censo et al. | |
| 2015/0179184 A1* | 6/2015 | Cudak | G10L 21/0208 704/233 |
| 2015/0264499 A1* | 9/2015 | Valeri | H04S 7/302 381/58 |
| 2016/0125892 A1* | 5/2016 | Bowen | G10L 15/20 704/226 |
| 2016/0196108 A1* | 7/2016 | Selig | G06F 3/165 700/94 |
| 2016/0275936 A1* | 9/2016 | Thorn | G10L 15/063 |
| 2016/0360327 A1* | 12/2016 | Ungstrup | H04R 25/505 |
| 2017/0213550 A1* | 7/2017 | Ali | G10L 15/20 |
| 2017/0374478 A1* | 12/2017 | Jones | G10L 21/0364 |
| 2018/0174580 A1 | 6/2018 | Kim et al. | |
| 2018/0233165 A1* | 8/2018 | Atkinson | G06F 3/165 |
| 2018/0315413 A1* | 11/2018 | Lee | B60L 1/00 |
| 2018/0350383 A1* | 12/2018 | Moghimi | G10L 21/0232 |
| 2019/0147853 A1* | 5/2019 | Gunasekara | G06F 16/90332 704/243 |
| 2019/0206417 A1* | 7/2019 | Woodruff | G10L 21/028 |
| 2019/0208317 A1* | 7/2019 | Woodruff | G06N 3/08 |
| 2019/0259381 A1* | 8/2019 | Ebenezer | H04R 3/005 |
| 2019/0339926 A1* | 11/2019 | Wahlberg | G10L 15/22 |
| 2022/0246161 A1* | 8/2022 | Verbeke | H03F 3/183 |

FOREIGN PATENT DOCUMENTS

| | | | | |
|---|---|---|---|---|
| JP | 3982823 B2 | 9/2007 | | |
| JP | 2009-302991 A | 12/2009 | | |
| KR | 10-2009-0094576 A | 9/2009 | | |
| KR | 10-2018-0070970 A | 6/2018 | | |
| WO | WO-2020068056 A1 * | 4/2020 | | G10L 15/02 |

OTHER PUBLICATIONS

Korean Office Action dated Apr. 30, 2022, issued in a counterpart Korean Application No. 10-2018-0077318.
Extended European Search Report dated Feb. 16, 2022, issued in a counterpart European Application No. 19829897.8.
Partial Supplementary European Search Report dated Oct. 6, 2021, issued in a counterpart European Application No. 19829897.8-1207 I 3806488.
Chinese Office Action dated Aug. 4, 2021, issued in a counterpart Chinese Application No. 201980044603.2.
http://www.guitarbuilding.org/wp-content/uploads/2014/06/Instrument-Sound-EQ-Chart.pdf; Jun. 2014.
International Search Report dated Oct. 4, 2019, issued in an International Application No. PCT/KR2019/007871.
Written Opinion of the International Search authority dated Oct. 4, 2019, issued in an International Application No. PCT/KR2019/007871.
Korean Final Office Action dated Nov. 28, 2022, issued in Korean Patent Application No. 10-2018-0077318.
Chinese Office Action dated Sep. 1, 2022, issued in Chinese Application No. 201980044603.2.

* cited by examiner

FIG. 8
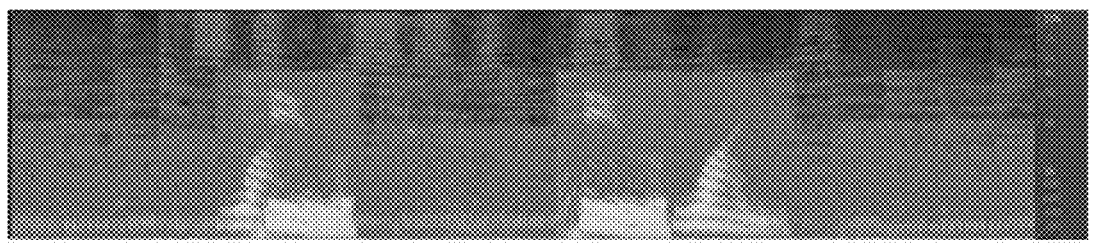
Original music file
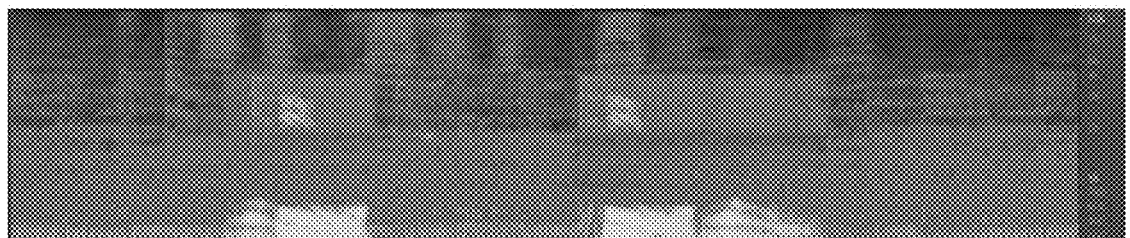
Processed music file

FIG. 9
Environment
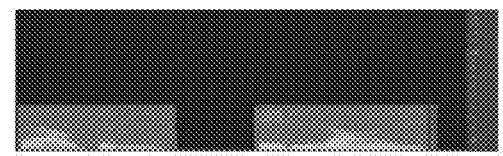
Voice Assistant
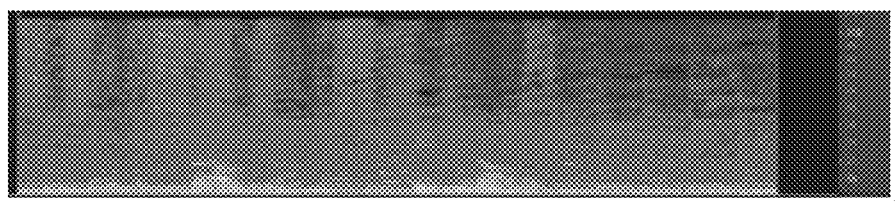
Signal „captured" by user (wihtout any modification)
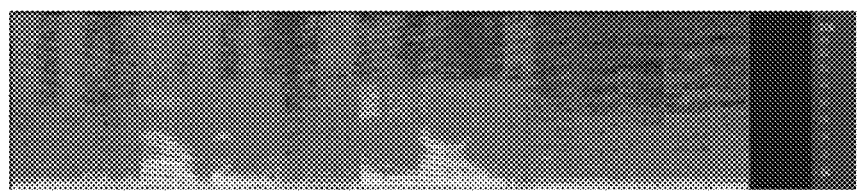
Signal „captured" by user (with modification of syntesised utterance)

DEVICE FOR OUTPUTTING SOUND AND METHOD THEREFOR

TECHNICAL FIELD

The present disclosure relates to a device for outputting sound and a method therefor. More particularly, the present disclosure relates to a sound output device for variably adjusting sound to be output and a method therefor.

BACKGROUND ART

As the industry advances, various electronic devices have been changing from analog to digital, and digitalization has been rapidly spreading even in the case of sound devices.

Recently, as electronic devices, such as a smartphone, for performing a combination of various functions have been developed, following digitalization, various electronic devices having a speech recognition function have been launched. The speech recognition function allows a user to easily control a device through speech without operating a separate button or touching a touch module.

For the speech recognition function, various artificial intelligence (AI) technologies may be used. Through linguistic understanding, the content of a user's utterance may be accurately recognized, and the user's intention included in the content of the utterance may be detected. In addition, through visual understanding, content used by the user may be understood, and through inference prediction, an appropriate answer according to the user's intention and the content being executed by the user may be generated. Furthermore, through movement control, the generated answer may be output in an appropriate form.

DESCRIPTION OF EMBODIMENTS

Technical Problem

A sound output device for variably adjusting sound to be output is required to provide improved performance.

Technical Solution to Problem

According to some embodiments, a device and method for predicting external sound and adjusting sound to be output, based on the predicted external sound may be provided.

According to some embodiments, a device and method for receiving external sound and predicting future external sound, based on the received external sound may be provided.

According to some embodiments, a device and method for predicting future external sound, based on previously stored information may be provided.

Advantageous Effects of Disclosure

A sound output device according to one or more embodiments may variably adjust sound to be output to allow a user to experience improved sound output.

BRIEF DESCRIPTION OF DRAWINGS

The present disclosure will be more apparent from the following detailed description taken in conjunction with the accompanying drawings, wherein reference numerals denote structural elements.

FIG. 8 is a diagram for describing sound adjusted by a device according to some embodiments.

FIG. 9 is a diagram for describing sound adjusted by a device according to some embodiments.

BEST MODE

Figure 1:
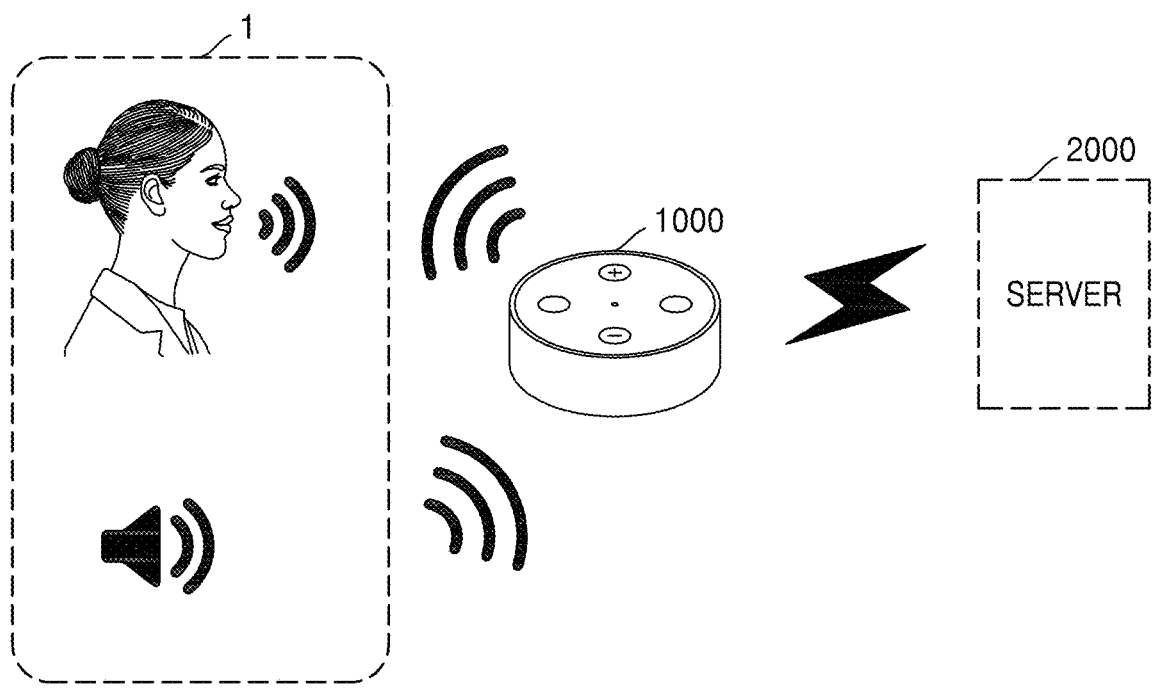
FIG. 1 is a diagram showing an example in which a device outputs sound according to some embodiments.

As a technical means for achieving the above-described technical problem, a sound output device according to an embodiment of the present disclosure includes a speaker configured to output sound, a memory storing one or more instructions, and a processor configured to execute the one or more instructions, wherein the processor may be configured to execute the one or more instructions to, predict external sound to be received from an external environment, variably adjust sound to be output from the speaker based on the predicted external sound, and control the speaker to output the adjusted sound.

In addition, a sound output method according to an embodiment of the present disclosure may include predicting external sound to be received from an external environment, variably adjusting sound to be output from the device, based on the predicted external sound, and outputting the adjusted sound.

In addition, a computer-readable recording medium according to an embodiment of the present disclosure may be a computer-readable recording medium having recorded thereon a program for executing the above-described method.

MODE OF DISCLOSURE

Reference will now be made in greater detail to embodiments of the present disclosure with reference to the accompanying drawings for one of ordinary skill in the art to implement the embodiments. However, the present disclosure may have different forms and is not limited to the embodiments described herein. In the drawings, parts irrelevant to the description are omitted to clearly describe the present disclosure, and like reference numerals denote like elements throughout.

Some embodiments of the present disclosure may be represented with functional blocks and various processing steps. Some or all of these functional blocks may be implemented by various numbers of hardware and/or software configurations for executing specific functions. For example, the functional blocks of the present disclosure may be implemented by one or more microprocessors or by circuit configurations for certain functions. In addition, for example, the functional blocks of the present disclosure may be implemented by various programming or scripting languages. Functional blocks may be implemented with algorithms executed in one or more processors. In addition, the present disclosure may adopt the related art for electronic environment setup, signal processing, and/or data processing.

In addition, connection lines or connection members between components shown in the drawings illustrate functional connections and/or physical or circuit connections. In an actual apparatus, connections between components may be represented by replaceable or additional various functional connections, physical connections, or circuit connections.

In addition, terms such as " . . . unit" and " . . . module" may refer to units that perform at least one function or operation, and the units may be implemented as hardware or software or as a combination of hardware and software. The "unit" or "module" may be implemented by a program stored in an addressable storage medium and executable by a processor.

Embodiments of the present disclosure have been particularly shown and described with reference to examples thereof to easily describe the technical content of the present disclosure and aid understanding of the present disclosure, and are not intended to limit the scope of the present disclosure. That is, it is obvious to one of ordinary skill in the art that various changes in form and details may be made therein without departing from the spirit and scope as defined in the following claims. In addition, embodiments may be combined with each other if necessary. For example, parts of an embodiment and another embodiment may be combined with each other to perform an operation of a device.

FIG. 1 is a diagram showing an example in which a device 1000 outputs sound according to some embodiments.

Referring to FIG. 1, the device 1000 may receive external sound, which is sound received from an external environment 1. In this regard, the external environment 1 may include a user providing a speech input, an external device playing multimedia content, and a noise source generating noise. In addition, the device 1000 may output sound to the external environment 1. The sound output by the device 1000 may include a speech guide, multimedia content, and a warning sound. However, this is an example, and the sound output by the device 1000 is not limited to the above-described example.

The device 1000 may predict external sound, which is sound received from the external environment 1. More specifically, the device 1000 may predict external sound to be received by the device 1000 from the external environment 1 in the future.

In an embodiment, the device 1000 may predict future external sound, based on previously received external sound. Alternatively, in an embodiment, the device 1000 may predict future external sound, based on information previously obtained by the device 1000. For example, the device 1000 may determine sound to be output by the device 1000 in the future, based on information about multimedia being currently played by the device 1000.

The device 1000 may variably adjust sound to be output from the device 1000, based on predicted external sound. In an embodiment, the device 1000 may variably adjust sound to be output to separate predicted external sound and sound to be output from each other in at least one of a frequency domain and a time domain.

In this regard, the device 1000 may variably adjust characteristics of a filter used to adjust sound to be output over time. For example, while continuously predicting external sound over time, the device 1000 may continuously determine a new filter, based on an updated prediction result.

A server 2000 may predict external sound by interacting with the device 1000. The device 1000 may be a smartphone, a tablet personal computer (PC), a PC, a smart television (TV), a mobile phone, a personal digital assistant (PDA), a laptop computer, a media player, a micro server, a global positioning system (GPS) device, an electronic book terminal, a digital broadcasting terminal, a navigation device, a kiosk, an MP3 player, a digital camera, a home appliance, or other mobile or non-mobile computing devices, but is not limited thereto. In addition, the device 1000 may be a wearable device, such as a watch, glasses, a hair band, or a ring, having a communication function and a data processing function. However, the device 1000 is not limited thereto and may include any device receiving external sound and outputting sound.

In addition, the device 1000 may communicate with a server and another device (not shown) through a certain network to use information about various external sounds. In this case, the network includes a local area network (LAN), a wide area network (WAN), a value added network (VAN), a mobile radio communication network, a satellite communication network, and a mutual combination thereof, and is a data communication network in a comprehensive sense, which allows network constituents to communicate with each other smoothly, and may include wired Internet, wireless Internet, and a mobile wireless communication network.

Wireless communication may include, for example, wireless LAN (Wi-Fi), Bluetooth, Bluetooth low energy, ZigBee, Wi-Fi Direct (WFD), ultra-wideband (UWB), Infrared Data Association (IrDA), Near Field Communication (NFC), etc., but is not limited thereto.

Figure 2:
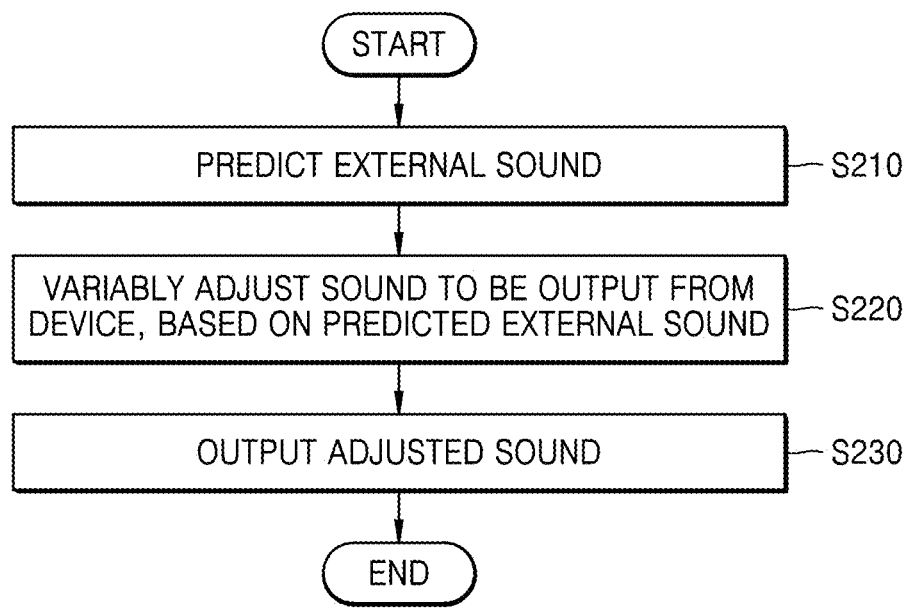
FIG. 2 is a flowchart of a method, performed by a device, of outputting sound according to some embodiments.

FIG. 2 is a flowchart of a method, performed by the device 1000, of outputting sound according to some embodiments.

In operation S210, the device 1000 may predict external sound, which is sound received from the external environment 1. More specifically, the device 1000 may predict external sound to be received by the device 1000 from the external environment 1 in the future. In an embodiment, the device 1000 may predict external sound to be received from the external environment 1 after a certain time. The certain time may be set in various ways, based on how the device 1000 predicts external sound.

In an embodiment, the device 1000 may predict future external sound, based on previously received external sound. To predict external sound, the device 1000 may previously obtain pieces of information about various sounds that may be received from the external environment 1. In an embodiment, the pieces of information about various sounds may include information about a speech input of a user, released music, or an announcement.

For example, when the device 1000 receives external sound including a speech of a user "Bixby," the device 1000 may predict that external sound including a speech of the user "Raise the volume" will be received. Alternatively, when the device 1000 receives external sound including a part of an already known music track, the device 1000 may predict that external sound including the next part of the music track will be received. Alternatively, when the device 1000 receives external sound including an announcement sound "The train is coming in," the device 1000 may predict that external sound including the next announcement sound "Please step back." will be received.

In an embodiment, the device 1000 may predict future external sound, based on information previously obtained by the device 1000. For example, the device 1000 may determine sound to be output by the device 1000 in the future, based on information about multimedia being currently played by the device 1000. The device 1000 may predict future external sound, based on the determined sound to be output in the future. Alternatively, the device 1000 may obtain information about multimedia being played by devices around the device 1000 from an external device or the server 2000 through a network and may predict future external sound, based on the obtained information.

In operation S220, the device 1000 may variably adjust sound to be output from the device 1000, based on predicted external sound.

In an embodiment, the device 1000 may variably adjust sound to be output to separate predicted external sound and sound to be output from each other in at least one of a frequency domain and a time domain. The device 1000 may determine at least one filter to be applied to sound to be output to separate predicted external sound and sound to be output from each other in at least one of a frequency domain and a time domain. In this regard, the device 1000 may variably adjust characteristics of the filter, such as number, frequency range, shape, and amplitude, over time. For example, while continuously predicting external sound over time, the device 1000 may continuously determine a new filter, based on an updated prediction result.

In an embodiment, sound to be output by the device 1000 may include a speech guide provided by the device 1000 to a user. The device 1000 may apply a filter to separate predicted external sound and sound to be output by the device 1000 from each other, and thus, a speech guide may be provided to the user more clearly.

In an embodiment, when predicted external sound includes a speech input of a user, the device 1000 may apply a filter to separate predicted external sound and sound to be output by the device 1000 from each other, and thus, the speech input of the user may be recognized more clearly.

In an embodiment, when predicted external sound includes sound including information, for example, a warning sound, the device 1000 may apply a filter to separate predicted external sound and sound to be output by the device 1000 from each other, and thus, the sound including information may be recognized by a user more clearly.

In operation S230, the device 1000 may output adjusted sound. The sound output by the device 1000 may be in various forms including a speech guide, multimedia content, and a warning sound.

Figure 3:
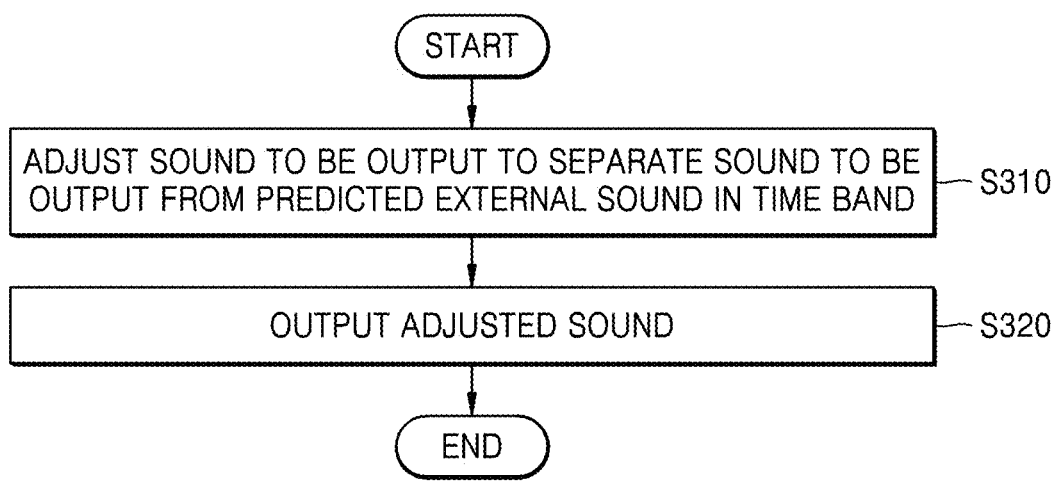
FIG. 3 is a flowchart showing a method, performed by a device, of variably adjusting sound to be output, based on predicted external sound, and outputting the adjusted sound according to some embodiments.

FIG. 3 is a flowchart showing a method, performed by the device 1000, of variably adjusting sound to be output, based on predicted external sound, and outputting the adjusted sound according to some embodiments.

In operation S310, the device 1000 may adjust sound to be output to separate sound to be output from predicted external sound in a time band. Separating the two sounds from each other in the time band may mean not overlapping the two sounds or overlapping the two sounds as much as a small amount in the time band. For example, the device 1000 may adjust sound to be output to output sound from the device 1000 at a time when a volume of external sound is predicted to be small.

In an embodiment, the device 1000 may decompose sound to be output into a plurality of components. For example, when sound to be output includes orchestra music, the device 1000 may decompose the orchestra music into components based on musical instruments. The device 1000 may independently control each component of sound to be output to separate sound to be output and predicted external sound from each other. For example, the device 1000 may selectively adjust only a drum-based component from among components of sound to be output to separate sound to be output and predicted external sound from each other. However, this is an example, and a component adjustment operation of the device 1000 is not limited to the above-described example.

In operation S320, the device 1000 may output adjusted sound. By outputting sound temporally separated from external sound, the device 1000 may allow a user to clearly recognize the external sound and the output sound.

Figure 4:
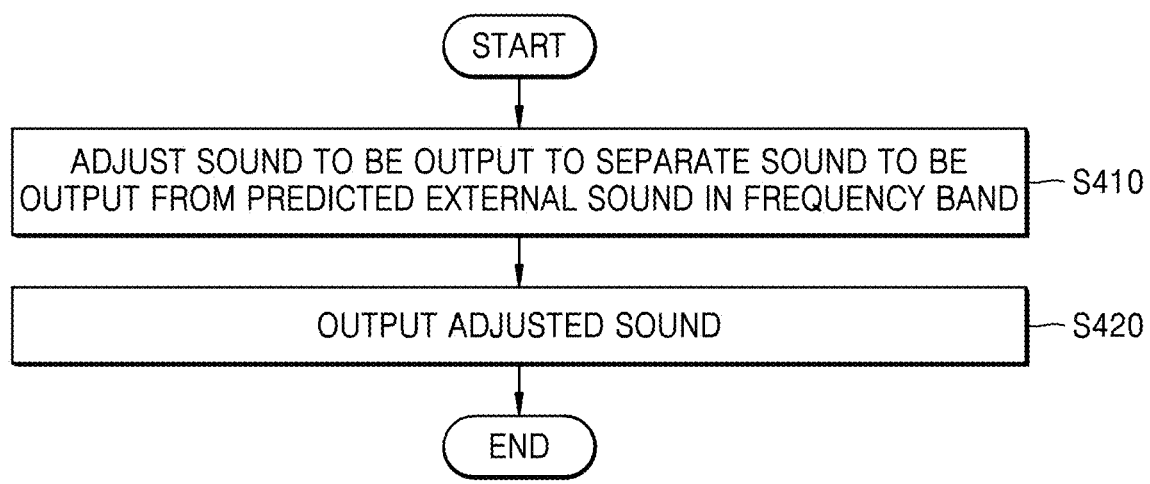
FIG. 4 is a flowchart showing a method, performed by a device, of variably adjusting sound to be output, based on predicted external sound, and outputting the adjusted sound according to some embodiments.

FIG. 4 is a flowchart showing a method, performed by the device 1000, of variably adjusting sound to be output, based on predicted external sound, and outputting the adjusted sound according to some embodiments.

In operation S410, the device 1000 may adjust sound to be output to separate sound to be output from predicted external sound in a frequency band. Separating the two sounds from each other in the frequency band may mean not overlapping the two sounds or overlapping the two sounds as much as a small amount in the frequency band. For example, the device 1000 may adjust sound to be output to locate a frequency of sound to be output from the device 1000 in a frequency band where the power of a frequency of external sound is predicted to be small.

In an embodiment, the device 1000 may decompose sound to be output into a plurality of components. The device 1000 may independently control each component of sound to be output to separate sound to be output and predicted external sound from each other. For example, the device 1000 may selectively adjust only a frequency of a flute-based component from among components of sound to be output to separate sound to be output and predicted external sound from each other. However, this is an example, and a component adjustment operation of the device 1000 is not limited to the above-described example.

In operation S420, the device 1000 may output adjusted sound. By outputting sound separated from external sound in terms of frequency, the device 1000 may allow a user to clearly recognize the external sound and the output sound.

Figure 5:
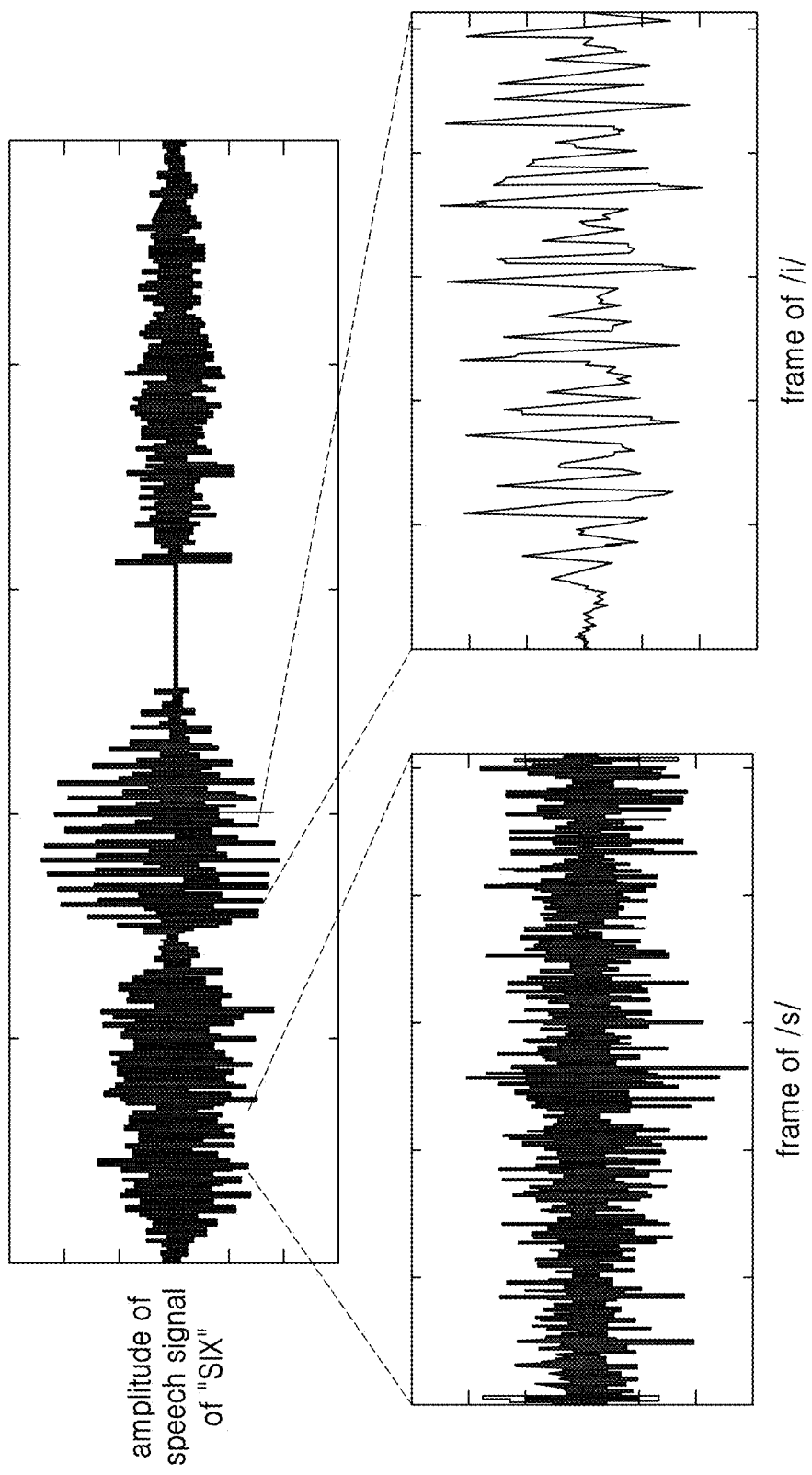
FIG. 5 is a diagram for describing external sound including a speech input of a user, according to some embodiments.

FIG. 5 is a diagram for describing external sound including a speech input of a user, according to some embodiments.

Referring to FIG. 5, a speech input of a user is illustrated as "six". However, this is an example, and it is obvious to one of ordinary skill in the art that the technical features of the present disclosure are not limited by the content of a speech input of a user.

Referring to FIG. 5, a part corresponding to "S" and a part corresponding to "I" of the speech input represent different frequency and power characteristics from each other. That is, frequency and power characteristics of external sound including a speech input change over time, and the device 1000 may predict the change by predicting the content of the speech input. To efficiently separate external sound from sound to be output, the device 1000 may variably adjust sound to be output over time, based on external sound including a predicted speech input.

Figure 6:
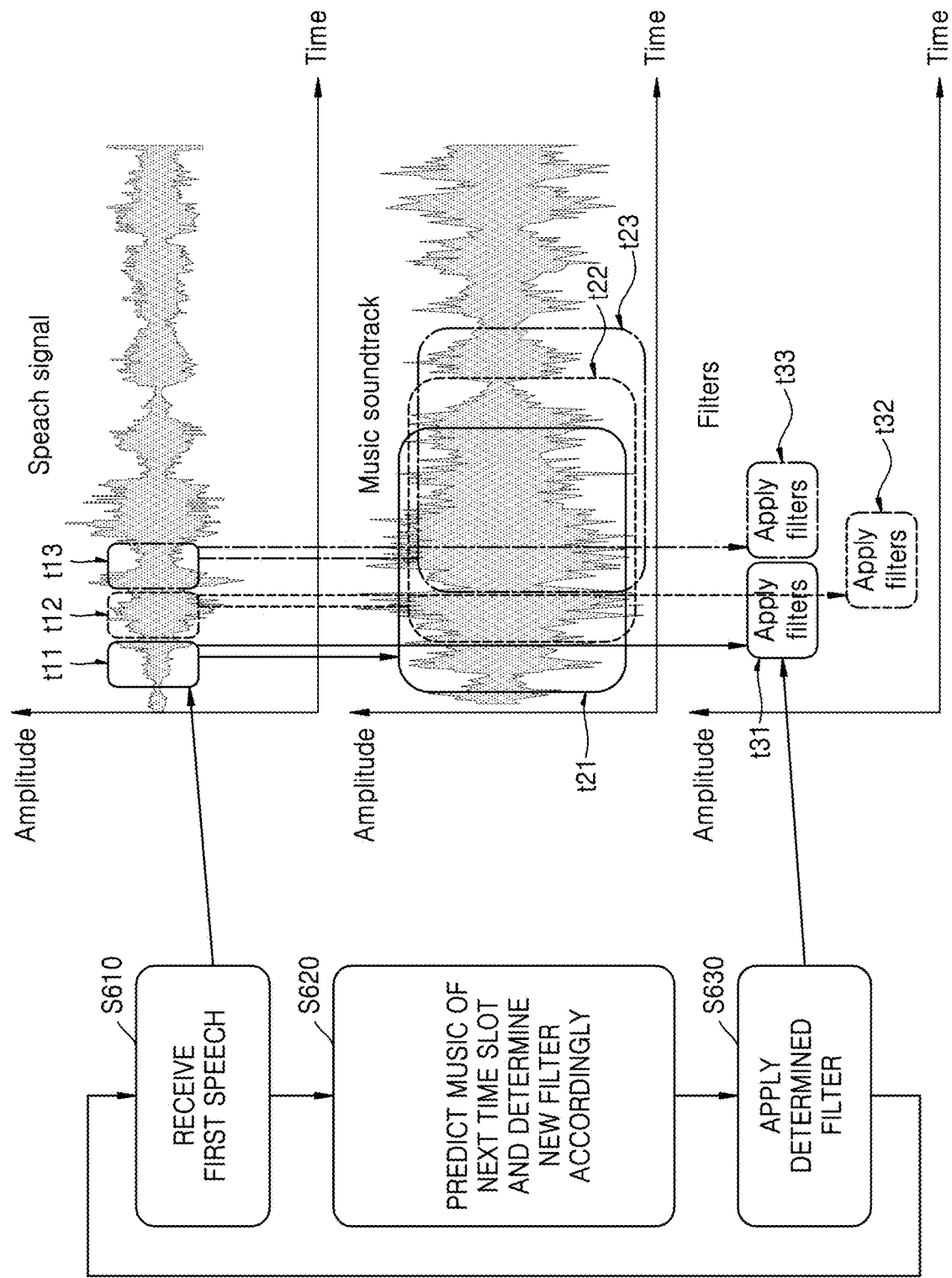
FIG. 6 is a diagram for describing an example in which a device variably adjusts sound according to some embodiments.

FIG. 6 is a diagram for describing an example in which the device 1000 variably adjusts sound according to some embodiments.

Referring to FIG. 6, external sound is illustrated as including a speech signal of a user, and sound to be output from the device 1000 is illustrated as including a music soundtrack. However, this is an example, and it is obvious to one of ordinary skill in the art that the technical features of the present disclosure are not limited by types of external sound and sound to be output from the device 1000.

Referring to FIG. 6, in operation S610, the device 1000 receives a first speech. The first speech is a part of the speech signal and includes a speech signal during a first reception time t11. The first reception time t11 may be a certain time during which the device 1000 receives external sound.

In operation S620, the device 1000 may predict a music soundtrack of the next time slot. In an embodiment, because the device 1000 already has information about a music soundtrack that the device 1000 is playing, the device 1000 may predict a music soundtrack to be output in the future, based on information that the device 1000 has in advance. For example, the device 1000 may predict a music soundtrack to be output during a first prediction time t21. The first prediction time t21 may be a certain time including sound to be output in the future, predicted by the device 1000.

In addition, the device 1000 may predict a speech signal of the next time slot. The device 1000 may predict external sound including a speech signal to be received during the first prediction time t21, based on the received first speech.

In an embodiment, the device 1000 may predict a speech model of a user having uttered a speech signal, based on the received first speech. In addition, the device 1000 may predict the content of a speech signal to be received during the first prediction time t21, based on the received first speech. The device 1000 may predict a speech signal to be received during the first prediction time t21 by using at least one of the predicted speech model and the content of the speech signal. For example, the device 1000 may determine a speech model of a female user, based on a first speech "Bixby." In addition, the device 1000 may predict the content of "Raise the volume," based on the first speech. The device 1000 may predict a speech signal, based on the determined speech model and the content.

The device 1000 may determine at least one filter to be applied to separate sound to be output from external sound during a first output time t31, based on predicted external sound and sound to be output. The first output time t31 may be a time during which the determined filter is applied to sound to be output.

The device 1000 may repeat operations S610, S620, and S630 described above. In this regard, the device 1000 may variably adjust characteristics of the filter, such as number, frequency range, shape, and amplitude, over time. While continuously predicting external sound over time, the device 1000 may continuously determine a new filter, based on an updated prediction result, thereby effectively separating external sound and sound to be output from each other.

Figure 7:
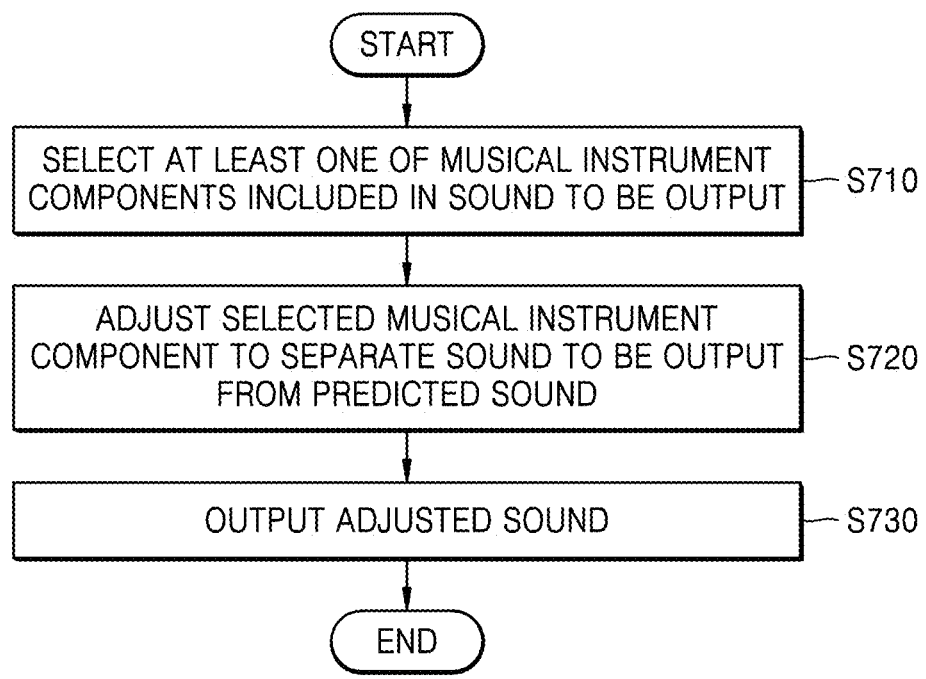
FIG. 7 is a diagram for describing an example in which a device decomposes and adjusts sound to be output into components according to some embodiments.

FIG. 7 is a diagram for describing an example in which the device 1000 decomposes and adjusts sound to be output into components according to some embodiments.

In operation S710, the device 1000 may decompose sound to be output into a plurality of musical instrument components and may select at least one of the plurality of musical instrument components. In an embodiment, the device 1000 may select a musical instrument component to make it easy to separate external sound and sound to be output from each other. For example, the device 1000 may select a musical instrument component that is perceived insensitive to a user. Alternatively, the device 1000 may select a musical instrument component of a frequency band where the power of external sound is predicted to be low. However, a method, performed by the device 1000, of selecting a musical instrument component is not limited to the above-described example.

In operation S720, the device 1000 may adjust the selected musical instrument component to separate sound to be output from predicted sound. In an embodiment, the device 1000 may adjust the selected musical instrument component, based on at least one of a time band and a frequency band.

In operation S730, the device 1000 may output adjusted sound. More specifically, the device 1000 may recombine adjusted musical instrument components with each other. The device 1000 may output combined sound.

FIG. 8 is a diagram for describing sound adjusted by the device 1000 according to some embodiments.

The upper spectrogram of FIG. 8 is a diagram showing, in time and frequency bands, the power of an existing music file not having been adjusted. The lower spectrogram of FIG. 8 is a diagram showing, in time and frequency bands, the power of a music file adjusted by the device 1000.

Referring to FIG. 8, a music file may be adjusted and output to be separated from external sound in time and frequency domains.

FIG. 9 is a diagram for describing sound adjusted by the device 1000 according to some embodiments.

A first spectrogram shown in FIG. 9 is a diagram showing, in time and frequency bands, the power of predicted external sound including an environment sound. A second spectrogram is a diagram showing, in time and frequency bands, the power of sound, including a voice assistant, to be output from the device 1000. A third spectrogram is a diagram showing, in time and frequency bands, the power of sound that a user receives when sound to be output from the device

1000 is not adjusted. A fourth spectrogram is a diagram showing, in time and frequency bands, the power of sound that a user receives when sound to be output from the device 1000 is adjusted.

Referring to FIG. 9, the device 1000 may allow a user to receive a voice assistant more clearly by separating sound to be output from external sound in a time or frequency band.

Figure 10:
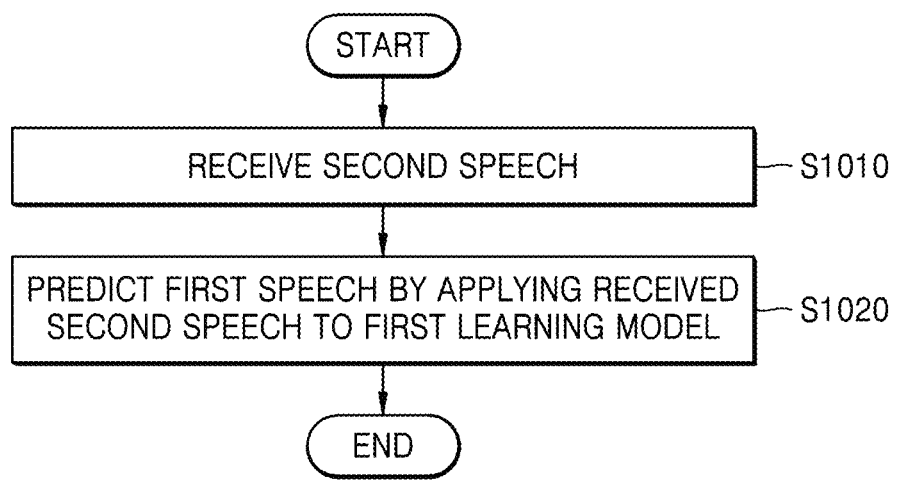
FIG. 10 is a diagram for describing a method, performed by a device, of predicting external sound according to some embodiments.

FIG. 10 is a diagram for describing a method, performed by the device 1000, of predicting external sound according to some embodiments.

Referring to FIG. 10, in operation S1010, the device 1000 may receive a second speech. The second speech may be a speech of a user included in external sound, received for a certain time.

In operation S1020, the device 1000 may predict a first speech by applying the second speech to a first learning model. The first speech may be a speech of the user included in external sound, which will be received after a certain time.

In an embodiment, a first learning model may be trained to determine a speech model of a user. By applying information about a speech of a user to a first learning model, the device 1000 may train the first learning model. For example, by applying information about a frequency of a speech and information about gender and vocal habits of a user to a first learning model, the device 1000 may train the first learning model.

In an embodiment, a first learning model may be trained to predict the content of a speech. By applying information about a speech input to a first learning model, the device 1000 may train the first learning model. For example, by applying information about a speech input history of a user to a first learning model, the device 1000 may train the first learning model.

In an embodiment, a first learning model may be previously set and stored in the device 1000. In this case, the server 2000 configured to generate and operate a first learning model may provide the first learning model to the device 1000, and the device 1000 may store and manage the first learning model received from the server 2000 in the device 1000.

In addition, a previously set first learning model may be stored in the server 2000. In this case, the device 1000 may provide trajectory information to the server and may receive word information determined based on the trajectory information from the server 2000. In addition, in this case, the first learning model may be managed for each user by the server 2000.

Figure 11:
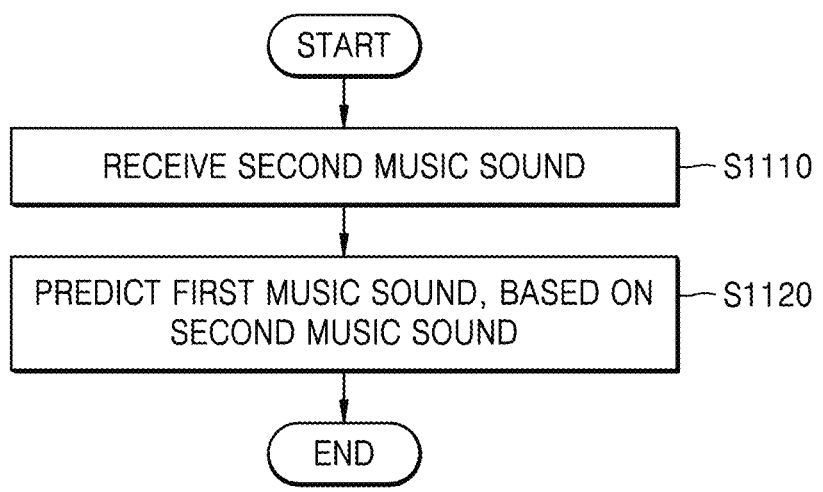
FIG. 11 is a diagram for describing a method, performed by a device, of predicting external sound according to some embodiments.

FIG. 11 is a diagram for describing a method, performed by the device 1000, of predicting external sound according to some embodiments.

Referring to FIG. 11, in operation S1110, the device 1000 may receive a second music sound. The second music sound may be a music sound included in external sound, received for a certain time. The second music sound may be a part of already published music.

In operation S1120, the device 1000 may predict a first music sound, based on the second music sound. The first music sound may be a music sound included in external sound, which will be received after a certain time. That is, the first music sound may be a part of already published music including the second music sound, the part being later than the second music sound.

In an embodiment, the device 1000 may predict a first music sound by applying a second music sound to a first learning model for identifying music. The device 1000 may identify already published music including the second music sound by using the first learning model. The device 1000 may predict a first music sound, based on the identified music.

Alternatively, the device 1000 may predict a first music sound by matching a second music sound with a database including information about at least one piece of music. The device 1000 may identify already published music including the second music sound by using the database. The device 1000 may predict a first music sound, based on the identified music.

Figure 12:
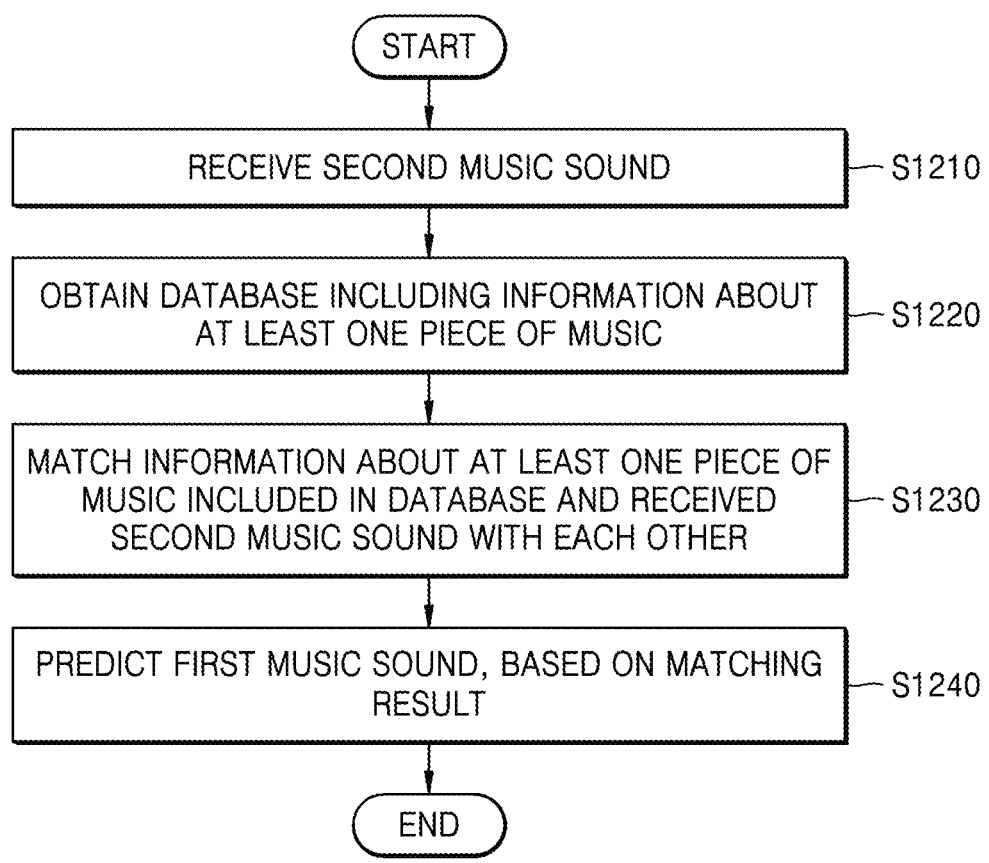
FIG. 12 is a diagram for describing a method, performed by a device, of predicting external sound according to some embodiments.

FIG. 12 is a diagram for describing a method, performed by the device 1000, of predicting external sound according to some embodiments.

In operation S1210, the device 1000 may receive a second music sound. The second music sound may be a music sound included in external sound, received for a certain time. The second music sound may be a part of already published music.

In operation S1220, the device 1000 may obtain a database including information about at least one piece of music. A database may be previously stored in the device 1000. Alternatively, the device 1000 may receive a database or information about a database from the server 2000.

In operation S1230, the device 1000 may match information about at least one piece of music included in the database and the received second music sound with each other. More specifically, the device 1000 may identify already published music including the second music sound by matching information about at least one piece of music included in the database and the second music sound with each other.

In operation S1240, the device 1000 may predict a first music sound, based on a matching result. More specifically, the device 1000 may predict a first music sound, based on music identified through matching.

Figure 13:
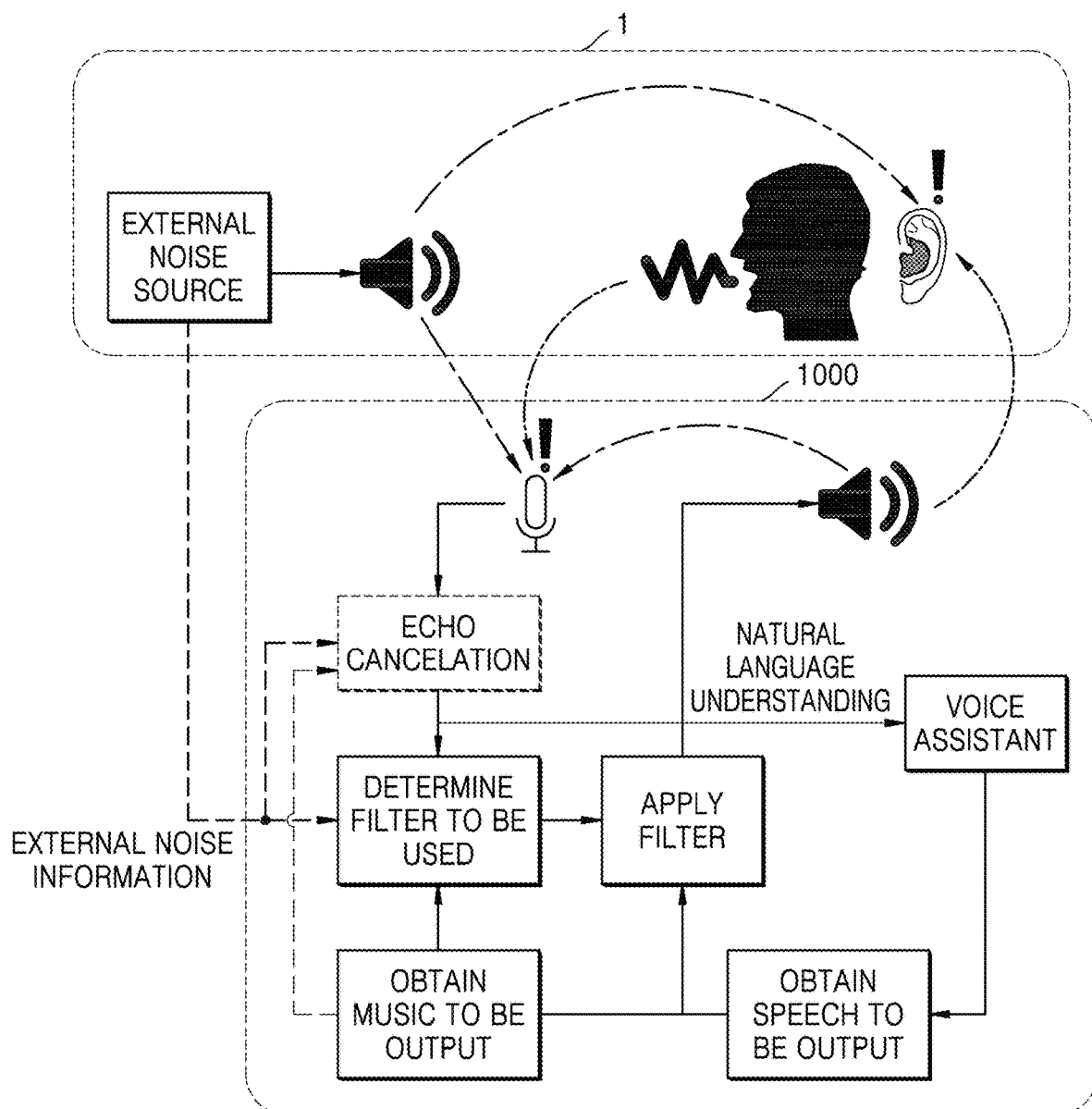
FIG. 13 is a diagram for describing a method, performed by a device, of outputting sound according to some embodiments.

FIG. 13 is a diagram for describing a method, performed by the device 1000, of outputting sound according to some embodiments.

Referring to FIG. 13, the external environment 1 includes various sound sources including an external noise source and a user. The device 1000 receives external sound including sounds generated from various sound sources from the external environment 1. Referring to FIG. 13, the external sound is illustrated as including external noise and a speech input of a user.

The device 1000 may perform echo cancellation while receiving external sound. In an embodiment, the device 1000 may receive external noise information from an external noise source connected through a network and may perform echo cancellation by using the received external noise information. In addition, in an embodiment, the device 1000 may perform echo cancellation, based on information about sound output by the device 1000, for example, music. The device 1000 may receive external sound more clearly by using echo cancellation.

The device 1000 may predict external sound. In an embodiment, the device 1000 may predict external sound, based on received external noise information and a received speech input of a user.

In addition, the device 1000 may obtain the content of the speech input by using natural language understanding (NLU). The device 1000 may obtain information about a speech to be output from the device 1000 by using a voice assistant in response to the content of the speech input.

The device 1000 may obtain information about music to be output from the device 1000. In an embodiment, the device 1000 may determine a filter for separating music to be output from external sound, based on the predicted external sound and the information about music to be output. In addition, in an embodiment, the device 1000 may determine a filter for separating a speech to be output and music to be output from each other, based on information about a speech to be output and music to be output.

The device 1000 may apply the determined filter to music and a speech to be output. The device 1000 may output music and a speech adjusted by using the filter.

Figure 14:
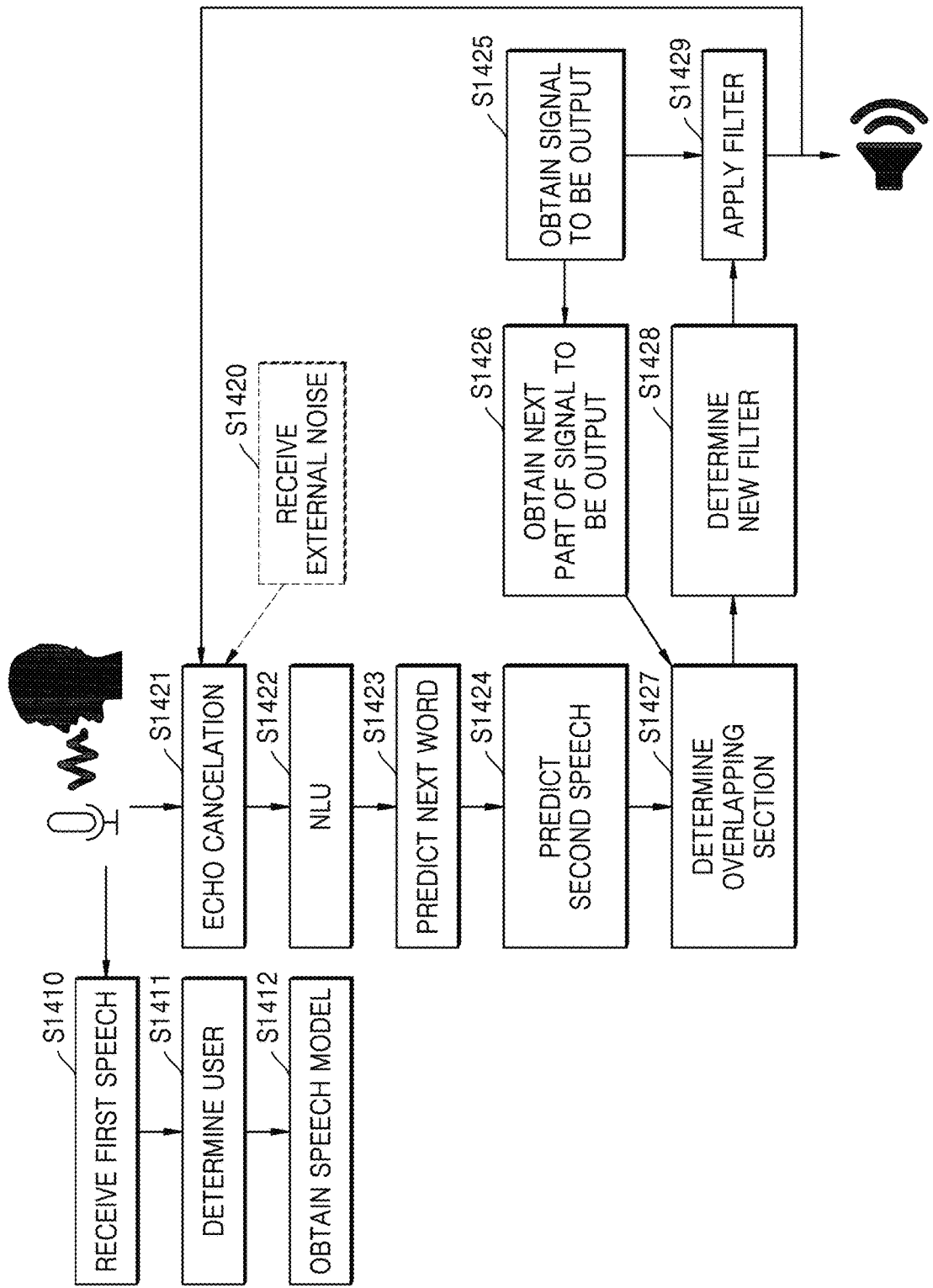
FIG. 14 is a diagram for describing a method, performed by a device, of outputting sound according to some embodiments.

FIG. 14 is a diagram for describing a method, performed by the device 1000, of outputting sound according to some embodiments.

In operation S1410, the device 1000 may receive a first speech. The first speech may be a speech of a user included in external sound, received for a certain time.

In operation S1411, the device 1000 may determine the user by using the received first speech. An operation of determining the user may include an operation of identifying whether the user is one of previously specified users or not.

In operation S1412, the device 1000 may obtain a speech model of the user by using the first speech. More specifically, the device 1000 may obtain a speech model of the user by inputting the first speech to a learning model trained to determine a speech model of the user.

In operation S1420, the device 1000 may receive external noise. The external noise may be a noise included in external sound, received for a certain time.

In operation S1421, the device 1000 may perform echo cancellation. In an embodiment, the device 1000 may receive external noise information from an external noise source connected through a network and may perform echo cancellation by using the received external noise information. In addition, in an embodiment, the device 1000 may perform echo cancellation, based on information about sound already output by the device 1000. The device 1000 may receive external sound more clearly by using echo cancellation.

In operation S1422, the device 1000 may perform an NLU operation on the received first speech. In an embodiment, the device 1000 may perform an NLU operation by applying the first speech to a learning model trained to understand natural language. The device 1000 may obtain the content of the first speech by using the NLU operation.

In operation S1423, the device 1000 may predict the next word of a speech input of the user, based on the obtained content of the first speech.

In operation S1424, the device 1000 may predict a second speech, based on the obtained speech model of the user and the predicted next word. The second speech may be a speech of the user included in external sound, which will be received after a certain time.

In operation S1425, the device 1000 may obtain a signal to be output from the device. In addition, in operation S1426, based on the obtained signal to be output, the device 1000 may obtain information about a signal to be output after a certain time.

In operation S1427, based on the predicted second speech and the obtained information about a signal to be output, the device 1000 may determine a section in which the second speech and the signal to be output will overlap each other.

In operation S1428, the device 1000 may determine a filter to be applied to the signal to be output in the overlapping section. The device 1000 may determine a filter to separate the second speech and the signal to be output from each other in the overlapping section.

In operation S1429, the device 1000 may output sound by applying the filter to the signal to be output.

Figure 15:
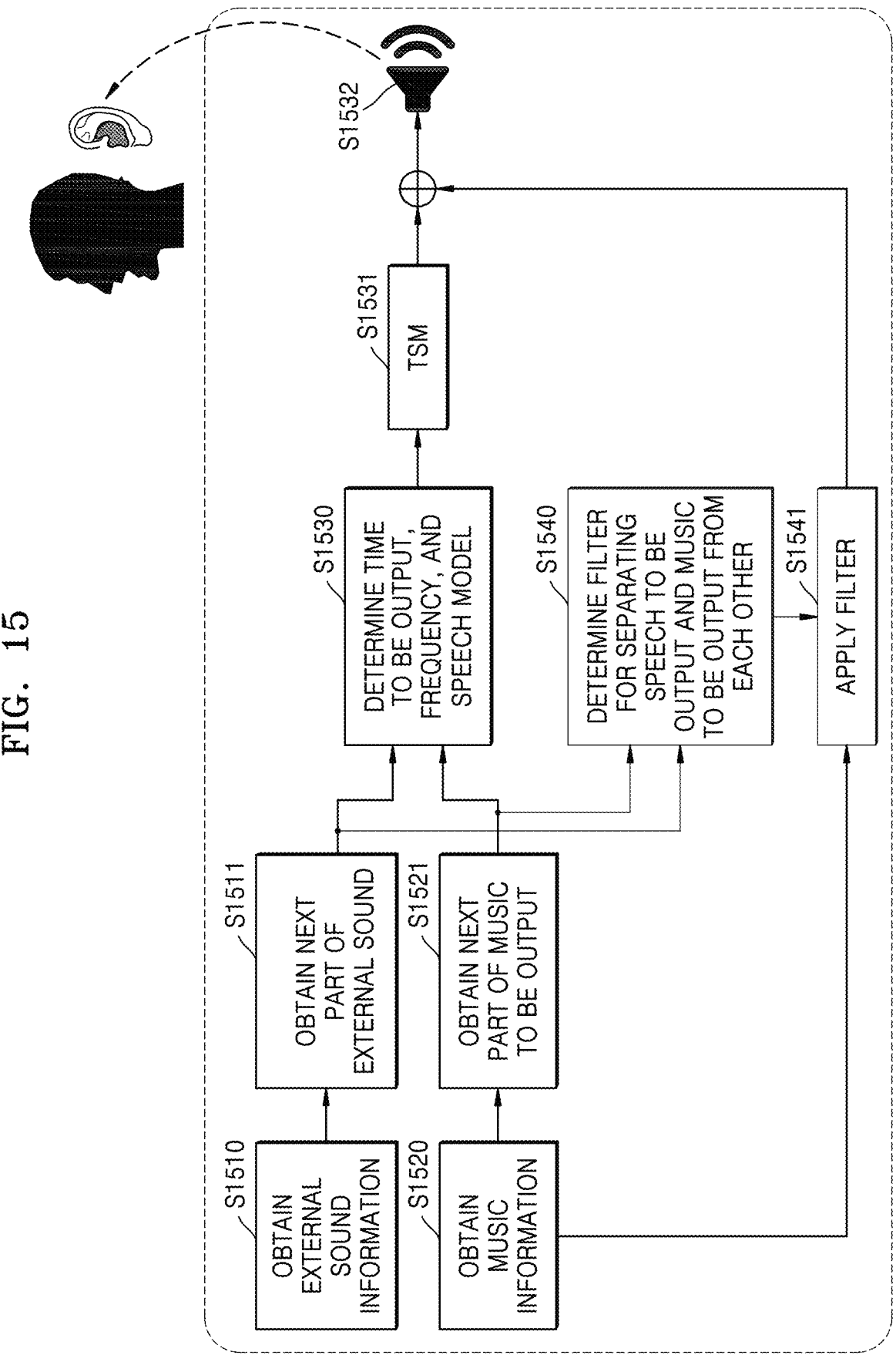
FIG. 15 is a diagram for describing a method, performed by a device, of outputting sound according to some embodiments.

FIG. 15 is a diagram for describing a method, performed by the device 1000, of outputting sound according to some embodiments.

In operation S1510, the device 1000 may obtain information about external sound. In an embodiment, the device 1000 may obtain information about external sound from external devices connected through a network. Alternatively, the device 1000 may obtain information about external sound from a server. In an embodiment, information about external sound may be information about multimedia content played from external devices. Alternatively, in an embodiment, information about external sound may be information about a warning sound to be issued at a place where the device 1000 is located. However, this is an example, and information about external sound in the present disclosure is not limited to the above-described embodiments.

In operation S1511, the device 1000 may obtain the next part of external sound. In an embodiment, the device 1000 may predict and obtain the next part of external sound, based on the obtained information about external sound. Alternatively, the device 1000 may directly receive information about the next part of external sound through a network.

In operation S1520, the device 1000 may obtain information about music being currently played by the device 1000.

In operation S1521, the device 1000 may obtain the next part of music to be output, based on the obtained information about music.

In operation S1530, the device 1000 may determine a frequency, a time to be output, and a speech model of a speech to be output from the device 1000, based on the obtained future external sound and music to be output.

More specifically, the device 1000 may determine a time to be output and a speech model of a speech to be output to separate the speech to be output from the obtained future external sound and music to be output in at least one of time and frequency bands.

In operation S1531, the device 1000 may generate a speech to be output, based on the determined frequency, time to be output, and speech model, by using a text-to-speech module (TSM).

In operation S1540, the device 1000 may determine a filter to be applied to music to be output to separate music to be output from a speech to be output from the device 1000.

In operation S1541, the device 1000 may apply the determined filter to music to be output.

In operation S1532, the device 1000 may output a combination of music having the filter applied and the generated speech.

Figure 16:
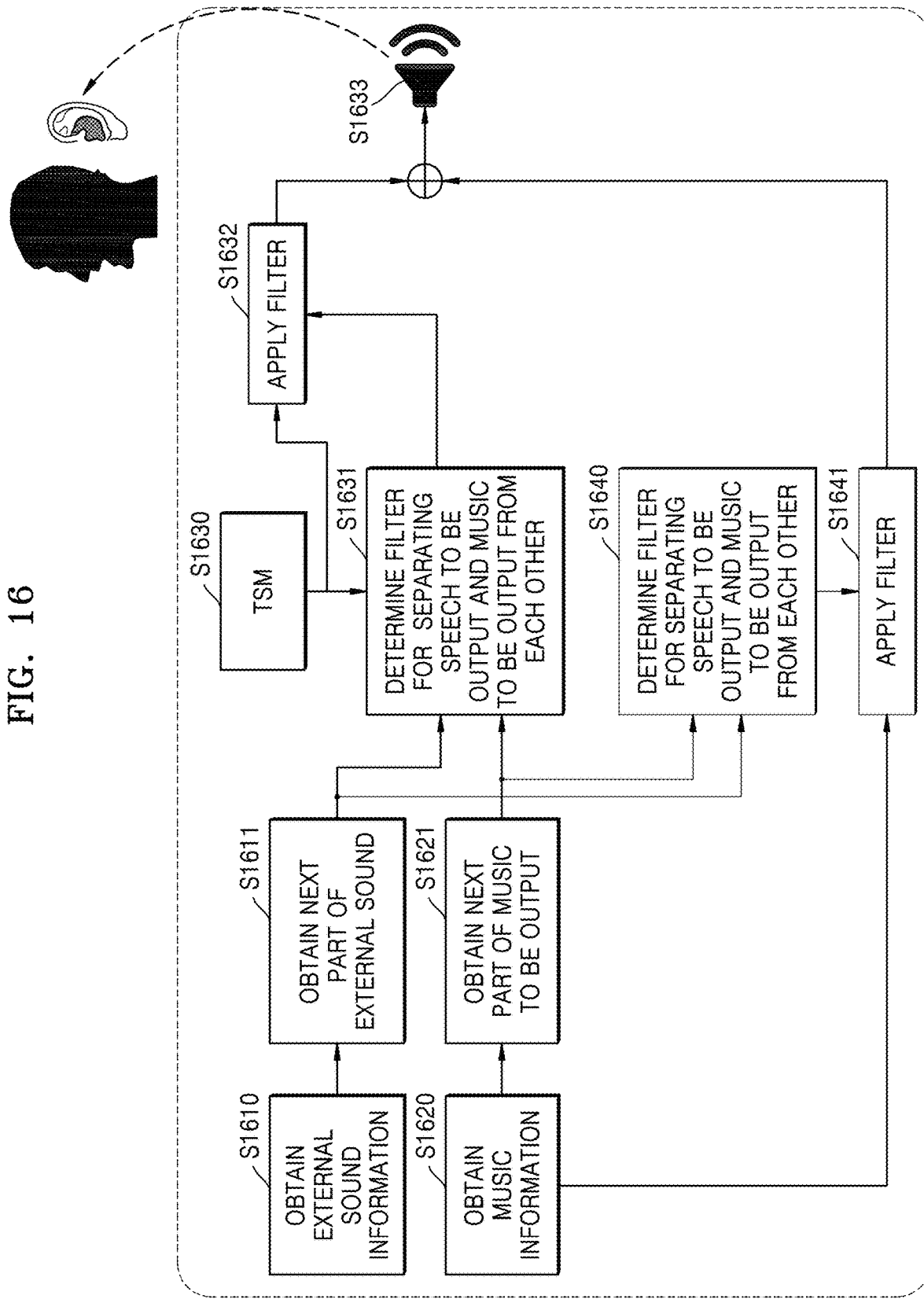
FIG. 16 is a diagram for describing a method, performed by a device, of outputting sound according to some embodiments.

FIG. 16 is a diagram for describing a method, performed by the device 1000, of outputting sound according to some embodiments.

In operation S1610, the device 1000 may obtain information about external sound. In an embodiment, the device 1000 may obtain information about external sound from external devices connected through a network. Alternatively, the device 1000 may obtain information about external sound from a server.

In operation S1611, the device 1000 may obtain the next part of external sound. In an embodiment, the device 1000 may predict and obtain the next part of external sound, based on the obtained information about external sound. Alternatively, the device 1000 may directly receive information about the next part of external sound through a network.

In operation S1620, the device 1000 may obtain information about music being currently played by the device 1000.

In operation S1621, the device 1000 may obtain the next part of music to be output, based on the obtained information about music.

In operation S1630, the device 1000 may generate a speech to be output by using a TSM.

In operation S1631, the device 1000 may determine a filter to be applied to the speech to be output to separate external sound from a speech to be output from the device 1000 and music to be output.

In operation S1640, the device 1000 may determine a filter to be applied to music to be output to separate external sound from a speech to be output from the device 1000 and music to be output.

In operations S1641 and S1632, the device 1000 may apply the determined filters to a speech and music to be output.

In operation S1633, the device 1000 may output a combination of music and a speech having the filters applied respectively.

Figure 17:
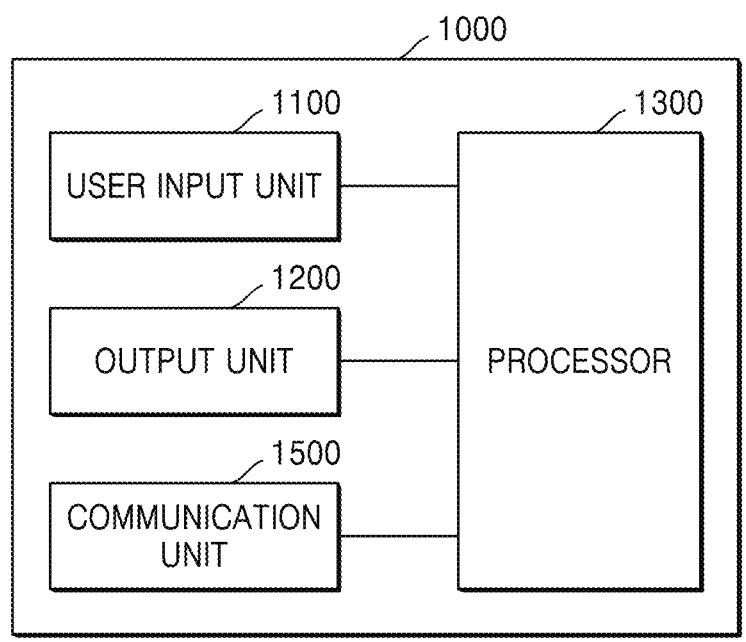
FIG. 17 is a block diagram of a device according to some embodiments.
Figure 18:
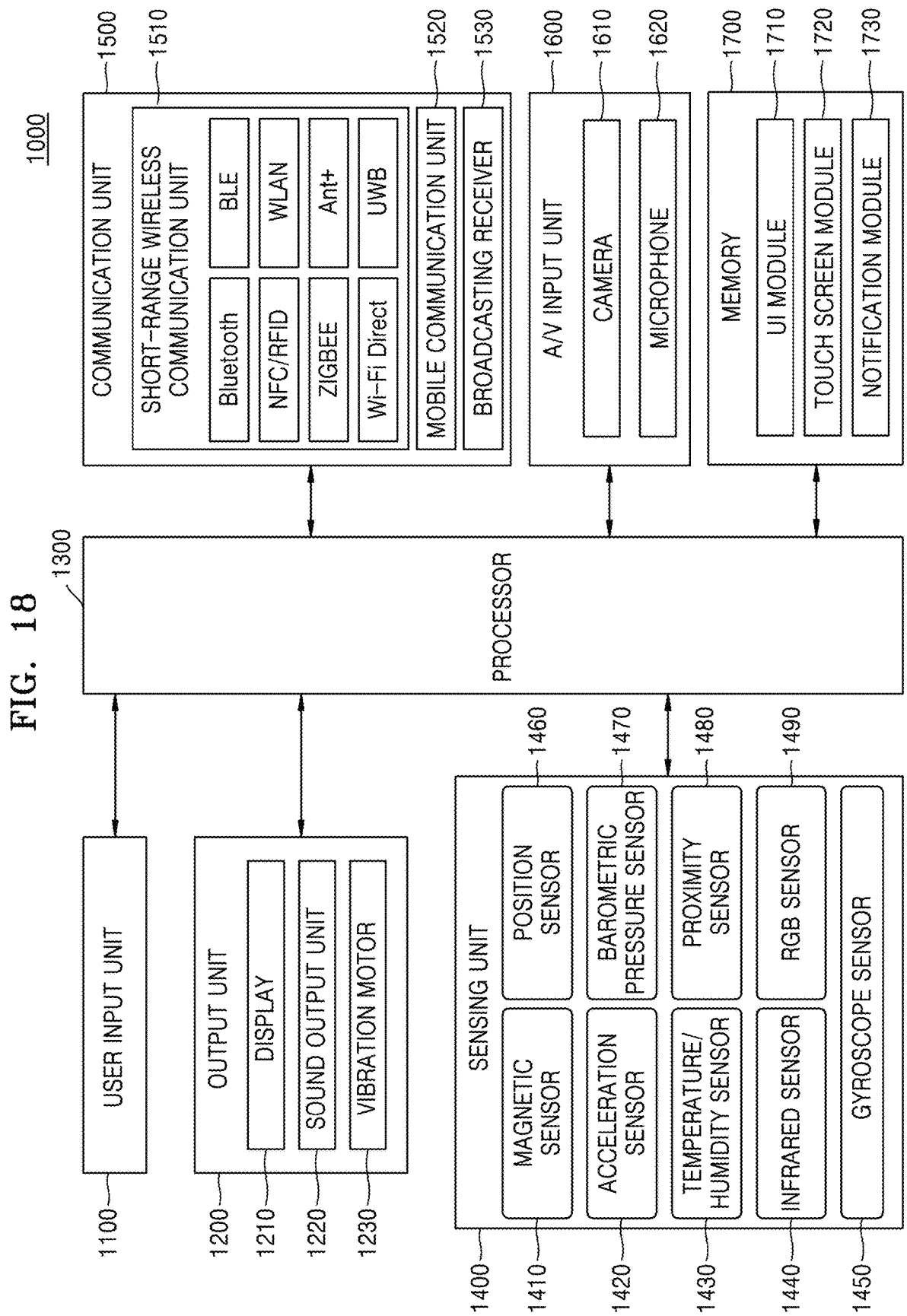
FIG. 18 is a block diagram of a device according to some embodiments.

FIGS. 17 and 18 are block diagrams of the device 1000 according to some embodiments.

As shown in FIGS. 17 and 18, the device 1000 according to some embodiments may include a user input unit 1100, an output unit 1200, a processor 1300, and a communication unit 1500. However, not all of the components shown in FIG. 17 are essential components of the device 1000. The device 1000 may be implemented by more components than the components shown in FIG. 17, or the device 1000 may be implemented by fewer components than the components shown in FIG. 17.

For example, as shown in FIG. 18, the device 1000 according to some embodiments may further include a sensing unit 1400, an audio/video (A/V) input unit 1600, and a memory 1700 in addition to the user input unit 1100, the output unit 1200, the processor 1300, and the communication unit 1500.

The user input unit 1100 may denote a tool by which a user inputs data to control the device 1000. For example, the user input unit 1100 may include a key pad, a dome switch, a touch pad (a contact type capacitive method, a pressure-type resistive method, an infrared ray detection method, a surface ultrasonic conduction method, an integral equation type tension measurement method, a piezoelectric effect method, etc.), a jog wheel, a jog switch, a microphone, etc., but is not limited thereto.

The user input unit 1100 may receive external sound from an external environment. In an embodiment, external sound may include a speech input of a user.

The output unit 1200 may output an audio signal, a video signal, or a vibration signal, and may include a display 1210, a sound output unit 1220, and a vibration motor 1230.

The display 1210 may display information processed by the device 1000. For example, the display 1210 may display a user interface for providing a speech input authentication result to a user.

When the display 1210 and a touch pad make a touch screen in a layer structure, the display 1210 may be used as an input device in addition to as an output device. The display 1210 may include at least one of a liquid crystal display, a thin film transistor-liquid crystal display, an organic light-emitting diode display, a flexible display, a three-dimensional (3D) display, and an electrophoretic display. In addition, the device 1000 may include two or more displays 1210 depending on an implementation type of the device 1000. In this regard, two or more displays 1210 may be arranged to face each other using a hinge.

The sound output unit 1220 may output audio data received from the communication unit 1500 or stored in the memory 1700. In addition, the sound output unit 1220 may output a sound signal related to a function performed by the device 1000 (for example, a call signal reception sound, a message reception sound, and a notification sound). The sound output unit 1220 may include a speaker and a buzzer.

The vibration motor 1230 may output a vibration signal. For example, the vibration motor 1230 may output a vibration signal corresponding to an output of audio data or video data (for example, the call signal receiving sound, the message receiving sound, etc.). In addition, the vibration motor 1230 may output a vibration signal when a touch is input to the touch screen.

The processor 1300 may usually control an overall operation of the device 1000. For example, the processor 1300 may generally control the user input unit 1100, the output unit 1200, the sensing unit 1400, the communication unit 1500, and the A/V input unit 1600 by executing programs stored in the memory 1700.

Specifically, the processor 1300 may predict future external sound and may variably adjust sound to be output, based on the predicted external sound.

In an embodiment, the processor 1300 may predict future external sound, based on previously received external sound. Alternatively, in an embodiment, the processor 1300 may predict future external sound, based on information previously obtained by the processor 1300. For example, the processor 1300 may determine sound to be output by the device 1000 in the future, based on information about multimedia being currently played by the device 1000.

The processor 1300 may variably adjust sound to be output from the device 1000, based on the predicted external sound. In an embodiment, the processor 1300 may variably adjust sound to be output to separate predicted external sound and sound to be output from each other in at least one of a frequency domain and a time domain.

In this regard, the processor 1300 may variably adjust characteristics of a filter used to adjust sound to be output over time. For example, while continuously predicting external sound over time, the processor 1300 may continuously determine a new filter, based on an updated prediction result.

The sensing unit 1400 may sense a state of the device 1000 or a state around the device 1000 and may transmit sensed information to the processor 1300.

The sensing unit 1400 may include at least one of a magnetic sensor 1410, an acceleration sensor 1420, a temperature/humidity sensor 1430, an infrared sensor 1440, a gyroscope sensor 1450, a position sensor (e.g. GPS) 1460, a barometric pressure sensor 1470, a proximity sensor 1480, and an RGB sensor (illuminance sensor) 1490, but is not limited thereto. The function of each sensor may be intuitively inferred from its name by one of ordinary skill in the art, and thus, a detailed description thereof will be omitted.

The communication unit 1500 may include one or more components that allow communication between the device 1000 and a head-mounted display (HMD) device or between the device 1000 and a server. For example, the communication unit 1500 may include a short-range wireless communication unit 1510, a mobile communication unit 1520, and a broadcasting receiver 1530.

The short-range wireless communication unit 1510 may include a Bluetooth communication unit, a Bluetooth low energy (BLE) communication unit, a Near Field Communication unit, a WLAN (Wi-Fi) communication unit, a ZigBee communication unit, an Infrared Data Association (IrDA) communication unit, a Wi-Fi Direct (WFD) communication unit, an ultra-wideband (UWB) communication unit, an Ant+ communication unit, etc., but is not limited thereto.

The mobile communication unit 1520 may transmit and receive wireless signals to and from at least one of a base station, an external terminal, and a server on a mobile communication network. In this regard, the wireless signals may include various types of data according to the transmission and reception of voice call signals, video call signals, or text/multimedia messages.

The broadcasting receiver 1530 may receive a broadcasting signal and/or information related to broadcasting from the outside through a broadcasting channel. The broadcasting channel may include a satellite channel and a terrestrial channel Depending on an implementation example, the device 1000 may not include the broadcasting receiver 1530.

In addition, the communication unit 1500 may transmit and receive information for using context information to and from an HMD device, a server, and a peripheral device.

The A/V input unit 1600 is to input an audio signal or a video signal and may include a camera 1610 and a microphone 1620. The camera 1610 may obtain an image frame such as a still image or a video through an image sensor in a video call mode or a shooting mode. An image captured through the image sensor may be processed through the processor 1300 or a separate image processor (not shown).

The image frame processed by the camera 1610 may be stored in the memory 1700 or may be transmitted to the outside through the communication unit 1500. Alternatively, the image frame may be used for the processor 1300 to perform an operation of determining a speech activation condition and a speech inactivation condition. Two or more cameras 1610 may be included depending on the configuration aspect of a terminal.

The microphone 1620 may receive external sound. The external sound received by the microphone 1620 may include a speech input. In addition, the microphone 1620 may receive an external sound signal and process the external sound signal into electrical speech data. For example, the microphone 1620 may receive a sound signal from an external device or a speaker. The microphone 1620 may use various noise removal algorithms for removing noise generated during a process of receiving an external sound signal including a speech input.

The memory 1700 may store a program for processing and controlling of the processor 1300 and may also store data input to the device 1000 or output from the device 1000.

The memory 1700 may include at least one type of storage medium from among a flash memory type, a hard disk type, a multimedia card micro type, a card type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Programs stored in the memory 1700 may be classified into a plurality of modules according to their functions, and for example, may be classified into a user interface (UI) module 1710, a touch screen module 1720, and a notification module 1730.

The UI module 1710 may provide a specialized UI, a graphical UI (GUI), etc., which are linked to the device 1000 for each application. The touch screen module 1720 may sense a touch gesture of a user on the touch screen and may transmit information about the touch gesture to the processor 1300. The touch screen module 1720 according to some embodiments may recognize and analyze touch code. The touch screen module 1720 may be configured as separate hardware including a controller.

Various sensors may be arranged inside or near the touch screen to sense a touch on the touch screen or a close touch. A tactile sensor is an example of a sensor for sensing a touch on the touch screen. The tactile sensor refers to a sensor that senses the contact of a particular object to the extent that a person feels it or more. The tactile sensor may sense various pieces of information such as roughness of a contact surface, hardness of a contact material, and temperature of a contact point.

In addition, a proximity sensor is an example of a sensor for sensing a touch on the touch screen.

The proximity sensor refers to a sensor that detects the presence or absence of an object approaching a certain detection surface or an object in the vicinity without mechanical contact by using the force of an electromagnetic field or infrared rays. Examples of the proximity sensor include a transmission-type photoelectric sensor, a direct reflection-type photoelectric sensor, a mirror reflection-type photoelectric sensor, a high-frequency oscillation-type proximity sensor, a capacitive type proximity sensor, a magnetic type proximity sensor, and an infrared proximity sensor. Various touch gestures of the user may include a tap, a touch and hold, a double tap, a drag, a fanning, a flick, a drag and drop, and a swipe.

The notification module 1730 may generate a signal to notify the occurrence of an event in the device 1000. Examples of an event occurring in the device 1000 include call signal reception, message reception, key signal input, and schedule notification. The notification module 1730 may output a notification signal in the form of a video signal through the display 1210, may output a notification signal in the form of an audio signal through the sound output unit 1220, or may output a notification signal in the form of a vibration signal through the vibration motor 1230.

Figure 19:
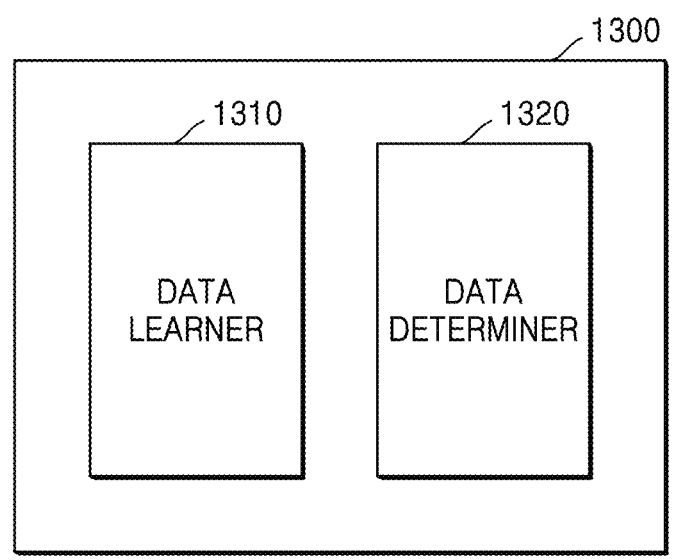
FIG. 19 is a block diagram of a processor according to some embodiments.

FIG. 19 is a block diagram of the processor 1300 according to some embodiments.

Referring to FIG. 19, the processor 1300 according to some embodiments may include a data learner 1310 and a data determiner 1320.

Depending on an embodiment, at least a portion of the data learner 1310 and at least a portion of the data determiner 1320 may be implemented as a software module or may be manufactured in the form of a hardware chip and mounted on a device.

The data learner 1310 may learn a reference for determining at least one of identification of a speech model of a user, identification of the content of a speech input, and identification of input music. The data learner 1310 may learn a reference as to which data to use to determine at least one of identification of a speech model of a user, identification of the content of a speech input, and identification of input music. In addition, the data learner 1310 may learn a reference as to how to determine a reference for determining at least one of identification of a speech model of a user, identification of the content of a speech input, and identification of input music by using provided data. The data learner 1310 may obtain data to be used for learning and apply the obtained data to a data determination model that will be described later, thereby learning a reference as to at least one of identification of a speech model of a user, identification of the content of a speech input, and identification of input music.

The data learner 1310 may provide functions of the learning models used by the device of FIGS. 1 to 16, and functions of the learning models used by the device of FIGS. 1 to 16 may be implemented by one or more data learners 1310.

The data determiner 1320 may perform an operation of at least one of identification of a speech model of a user, identification of the content of a speech input, and identification of input music, based on data. The data determiner 1320 may perform an operation of at least one of identification of a speech model of a user, identification of the content of a speech input, and identification of input music from certain data by using a trained data determination model. The data determiner 1320 may obtain certain data according to a preset reference by learning and may use a data determination model with the obtained data as an input value. In addition, by using this, the data determiner 1320 may perform an operation of at least one of identification of a speech model of a user, identification of the content of a speech input, and identification of input music from certain data based on certain data. In addition, a resultant value output by the data determination model with the obtained data as an input value may be used to refine the data determination model.

At least one of the data learner 1310 and the data determiner 1320 may be manufactured in the form of at least one hardware chip and mounted on the device 1000. For example, at least one of the data learner 1310 and the data determiner 1320 may be manufactured in the form of a dedicated hardware chip for artificial intelligence (AI) or may be manufactured as a part of an existing general-purpose processor (e.g. a central processing unit (CPU) or an application processor) or a graphics-only processor (e.g., a graphics processing unit (GPU)) and mounted on various devices 1000 described above. In this regard, a dedicated hardware chip for AI, which is a dedicated processor specialized in probability calculation, has parallel processing performance higher than a general-purpose processor of the related art and thus may quickly process computations in the field of AI such as machine learning.

The data learner 1310 and the data determiner 1320 may be mounted on one device or may be respectively mounted on separate devices. For example, one of the data learner 1310 and the data determiner 1320 may be included in a device, and the other may be included in a server. In addition, the data learner 1310 and the data determiner 1320 may provide model information constructed by the data learner 1310 to the data determiner 1320 in a wired or wireless manner, and data input to the data determiner 1320 may be provided to the data learner 1310 as additional training data.

At least one of the data learner 1310 and the data determiner 1320 may be implemented as a software module. When at least one of the data learner 1310 and the data determiner 1320 is implemented as a software module (or a program module including instructions), the software module may be stored in non-transitory computer-readable recording media. In addition, in this case, at least one software module may be provided by an operating system (OS) or by a certain application. Alternatively, some of at least one software module may be provided by an OS, and the others may be provided by a certain application.

Figure 20:
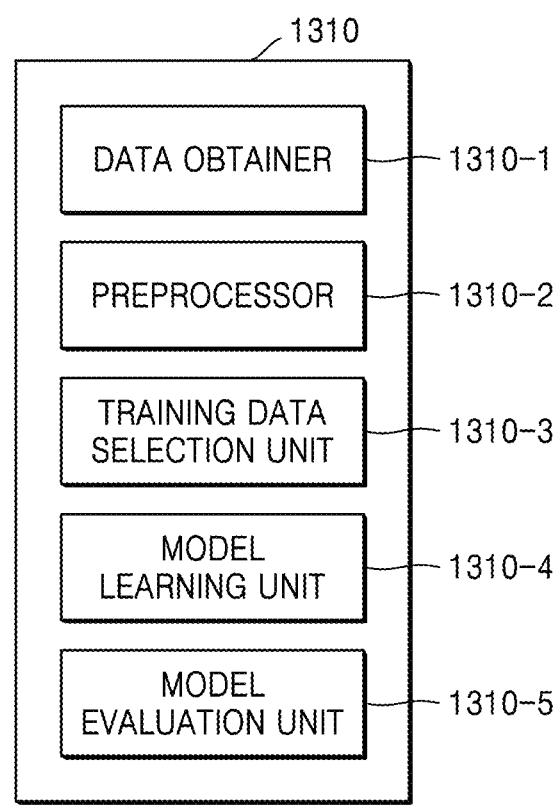
FIG. 20 is a block diagram of a data learner according to some embodiments.

FIG. 20 is a block diagram of the data learner 1310 according to some embodiments.

Referring to FIG. 20, the data learner 1310 according to some embodiments may include a data obtainer 1310-1, a preprocessor 1310-2, a training data selection unit 1310-3, a model learning unit 1310-4, and a model evaluation unit 1310-5.

The data obtainer 1310-1 may obtain data required to perform an operation of at least one of identification of a speech model of a user, identification of the content of a speech input, and identification of input music from certain data. The data obtainer 1310-1 may obtain, for example, information about a certain user speech or music.

The preprocessor 1310-2 may pre-process the obtained data to use the obtained data in learning for performing an operation of at least one of identification of a speech model of a user, identification of the content of a speech input, and identification of input music from certain data. The preprocessor 1310-2 may process the obtained data in a preset format so that the model learning unit 1310-4 described below may use the obtained data for learning for performing an operation of at least one of identification of a speech model of a user, identification of the content of a speech input, and identification of input music from certain data.

The training data selection unit 1310-3 may select data required for learning from the preprocessed data. The selected data may be provided to the model learning unit 1310-4. The training data selection unit 1310-3 may select data required for learning from the preprocessed data according to a preset reference to perform an operation of at least one of identification of a speech model of a user, identification of the content of a speech input, and identification of input music from certain data. In addition, the training data selection unit 1310-3 may select data according to a preset reference by learning by the model learning unit 1310-4 described below.

The model learning unit 1310-4 may learn a reference for performing an operation of at least one of identification of a speech model of a user, identification of the content of a speech input, and identification of input music from certain data, based on training data. In addition, the model learning unit 1310-4 may learn a reference as to which training data to use to perform an operation of at least one of identification of a speech model of a user, identification of the content of a speech input, and identification of input music from certain data.

In addition, the model learning unit 1310-4 may train a data determination model used to perform an operation of at least one of identification of a speech model of a user, identification of the content of a speech input, and identification of input music from certain data by using training data. In this case, the data determination model may be a previously constructed model. For example, the data determination model may be a model previously constructed by receiving basic training data (for example, sample data).

The data determination model may be constructed considering an application field of a determination model, a purpose of learning, or computer performance of a device. The data determination model may be designed to simulate a human brain structure on a computer. The data determination model may include a plurality of network nodes having weights, which simulate neurons of a human neural network. The plurality of network nodes may be connected to each other to simulate synaptic activity in which neurons exchange signals through synapses. The data determination model may include, for example, a neural network model or a deep learning model developed from the neural network model. In the deep learning model, a plurality of network nodes may exchange data according to convolution connection relations while being positioned at different depths (or layers). The data determination model may include, for example, models such as a deep neural network (DNN), a recurrent neural network (RNN), and a bidirectional recurrent deep neural network (BRDNN), and is not particularly limited to the above-described example.

According to various embodiments, when there are a plurality of data determination models that are previously constructed, the model learning unit 1310-4 may determine a data determination model having a high correlation between input training data and basic training data as a data determination model to be trained. In this case, the basic training data may be previously classified according to each type of data, and the data determination model may be previously constructed according to each type of data. For example, the basic training data may be previously classified according to various references such as a region where the training data is generated, a time at which the training data is generated, a size of the training data, a genre of the training data, a creator of the training data, and a type of object in the training data.

In addition, the model learning unit 1310-4 may train the data determination model, for example, by using a learning algorithm including an error back-propagation method or a gradient descent method.

In addition, the model learning unit 1310-4 may train the data determination model, for example, through supervised learning using training data as an input value. In addition, the model learning unit 1310-4 may train the data determination model, for example, through unsupervised learning which finds a reference for situation determination by self-learning a type of data required for situation determination without any guidance. In addition, the model learning unit 1310-4 may train the data determination model, for example, through reinforcement learning using feedback on whether a result of situation determination based on learning is correct.

In addition, when the data determination model is trained, the model learning unit 1310-4 may store the trained data determination model. In this case, the model learning unit 1310-4 may store the trained data determination model in a memory of an electronic device including the data determiner 1320. Alternatively, the model learning unit 1310-4 may store the trained data determination model in a memory of an electronic device including the data determiner 1320 described below. Alternatively, the model learning unit 1310-4 may store the trained data determination model in a memory of a server connected to an electronic device over a wired or wireless network.

In this case, a memory in which the trained data determination model is stored may also store, for example, a command or data related to at least one other component of the electronic device. In addition, the memory may store software and/or a program. The program may include, for example, a kernel, middleware, an application programming interface (API) and/or an application program (or an "application").

The model evaluation unit 1310-5 may input evaluation data to the data determination model, and when a determination result output from the evaluation data fails to satisfy a certain reference, the model evaluation unit 1310-5 may allow the model learning unit 1310-4 to be trained again. In this case, evaluation data may be preset data for evaluating the data determination model.

For example, when the number or ratio of evaluation data having an incorrect determination result from among determination results of the trained data determination model with respect to evaluation data exceeds a preset threshold, the model evaluation unit 1310-5 may evaluate that the data determination model fails to satisfy a certain reference. For example, in a case where the certain reference is defined as a ratio of 2%, when the trained data determination model outputs an incorrect determination result with respect to evaluation data exceeding 20 from among a total of 1000 evaluation data, the model evaluation unit 1310-5 may evaluate that the trained data determination model is not suitable.

When there are a plurality of trained data determination models, the model evaluation unit 1310-5 may evaluate whether each of the trained video determination models satisfies a certain reference and may determine a model satisfying the certain reference as a final data determination model. In this case, when a plurality of models satisfy the certain reference, the model evaluation unit 1310-5 may determine any one or a certain number of models previously set in descending order of evaluation scores as the final data determination model.

At least one of the data obtainer 1310-1, the preprocessor 1310-2, the training data selection unit 1310-3, the model learning unit 1310-4, and the model evaluation unit 1310-5 in the data learner 1310 may be manufactured in the form of at least one hardware chip and mounted on an electronic device. For example, at least one of the data obtainer 1310-1, the preprocessor 1310-2, the training data selection unit 1310-3, the model learning unit 1310-4, and the model evaluation unit 1310-5 may be manufactured in the form of a dedicated hardware chip for AI or may be manufactured as a part of an existing general-purpose processor (e.g. a CPU or an application processor) or a graphics-only processor (e.g., a GPU) and mounted on various electronic devices described above.

In addition, the data obtainer 1310-1, the preprocessor 1310-2, the training data selection unit 1310-3, the model learning unit 1310-4, and the model evaluation unit 1310-5 may be mounted on one electronic device or may be respectively mounted on separate electronic devices. For example, some of the data obtainer 1310-1, the preprocessor 1310-2, the training data selection unit 1310-3, the model learning unit 1310-4, and the model evaluation unit 1310-5 may be included in an electronic device, and the others may be included in a server.

In addition, at least one of the data obtainer 1310-1, the preprocessor 1310-2, the training data selection unit 1310-3, the model learning unit 1310-4, and the model evaluation unit 1310-5 may be implemented as a software module. When at least one of the data obtainer 1310-1, the preprocessor 1310-2, the training data selection unit 1310-3, the model learning unit 1310-4, and the model evaluation unit 1310-5 is implemented as a software module (or a program module including instructions), the software module may be stored in non-transitory computer-readable recording media. In addition, in this case, at least one software module may be provided by an OS or by a certain application. Alternatively, some of at least one software module may be provided by an OS, and the others may be provided by a certain application.

Figure 21:
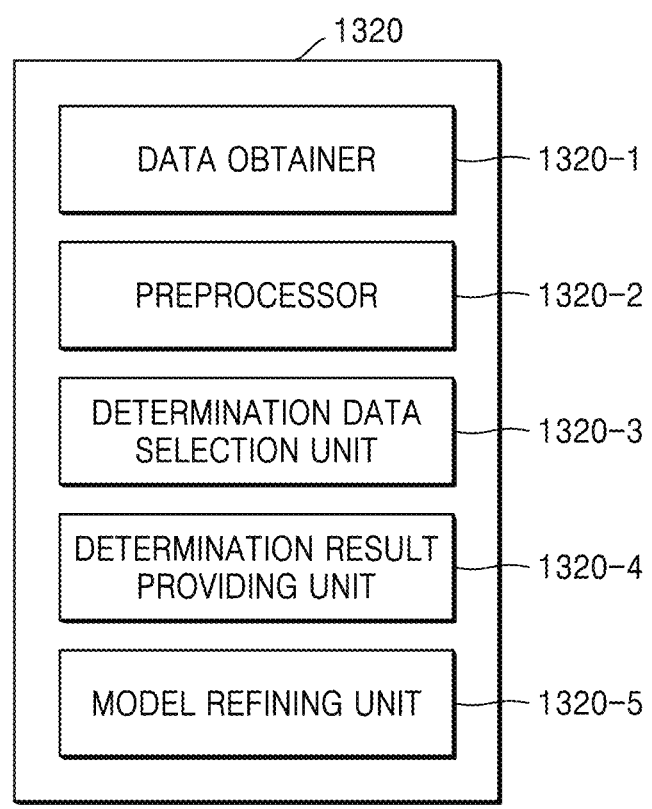
FIG. 21 is a block diagram of a data determiner according to some embodiments.

FIG. 21 is a block diagram of the data determiner 1320 according to some embodiments.

Referring to FIG. 21, the data determiner 1320 according to some embodiments may include a data obtainer 1320-1, a preprocessor 1320-2, a determination data selection unit 1320-3, a determination result providing unit 1320-4 and a model refining unit 1320-5.

The data obtainer 1320-1 may obtain data required to perform an operation of at least one of identification of a speech model of a user, identification of the content of a speech input, and identification of input music from certain data, and the preprocessor 1320-2 may pre-process the obtained data to use the obtained data to perform an operation of at least one of identification of a speech model of a user, identification of the content of a speech input, and identification of input music from certain data. The preprocessor 1320-2 may process the obtained data in a preset format so that the determination result providing unit 1320-4 described below may use the obtained data to perform an operation of at least one of identification of a speech model of a user, identification of the content of a speech input, and identification of input music from certain data.

The determination data selection unit 1320-3 may select data required to perform an operation of at least one of identification of a speech model of a user, identification of the content of a speech input, and identification of input music from certain data from the preprocessed data. The selected data may be provided to the determination result providing unit 1320-4. The determination data selection unit 1320-3 may select some or all of the preprocessed data according to a preset reference to perform an operation of at least one of identification of a speech model of a user, identification of the content of a speech input, and identification of input music from certain data. In addition, the determination data selection unit 1320-3 may select data according to a preset reference by learning by the model learning unit 1310-4 described below.

The determination result providing unit 1320-4 may perform an operation of at least one of identification of a speech model of a user, identification of the content of a speech input, and identification of input music from certain data by applying the selected data to a data determination model. The determination result providing unit 1320-4 may provide a determination result according to a data determination purpose. The determination result providing unit 1320-4 may apply the selected data to a data determination model by using the data selected by the determination data selection unit 1320-3 as an input value. In addition, a determination result may be determined by the data determination model.

The model refining unit 1320-5 may modify the data determination model, based on evaluation of the determination result provided by the determination result providing unit 1320-4. For example, the model refining unit 1320-5 may provide the determination result provided by the determination result providing unit 1320-4 to the model learning unit 1310-4 so that the model learning unit 1310-4 may modify the data determination model.

At least one of the data obtainer 1320-1, the preprocessor 1320-2, the determination data selection unit 1320-3, the determination result providing unit 1320-4, and the model refining unit 1320-5 in the data determiner 1320 may be manufactured in the form of at least one hardware chip and mounted on an electronic device. For example, at least one of the data obtainer 1320-1, the preprocessor 1320-2, the determination data selection unit 1320-3, the determination result providing unit 1320-4, and the model refining unit 1320-5 may be manufactured in the form of a dedicated hardware chip for AI or may be manufactured as a part of an existing general-purpose processor (e.g., a CPU or an application processor) or a graphics-only processor (e.g., a GPU) and mounted on various electronic devices described above.

In addition, the data obtainer 1320-1, the preprocessor 1320-2, the determination data selection unit 1320-3, the determination result providing unit 1320-4, and the model refining unit 1320-5 may be mounted on one electronic device or may be respectively mounted on separate electronic devices. For example, some of the data obtainer 1320-1, the preprocessor 1320-2, the determination data selection unit 1320-3, the determination result providing unit 1320-4, and the model refining unit 1320-5 may be included in an electronic device, and the others may be included in a server.

In addition, at least one of the data obtainer 1320-1, the preprocessor 1320-2, the determination data selection unit 1320-3, the determination result providing unit 1320-4, and the model refining unit 1320-5 may be implemented as a software module. When at least one of the data obtainer 1320-1, the preprocessor 1320-2, the determination data selection unit 1320-3, the determination result providing unit 1320-4, and the model refining unit 1320-5 is implemented as a software module (or a program module including instructions), the software module may be stored in non-transitory computer-readable recording media. In addition, in this case, at least one software module may be provided by an OS or by a certain application. Alternatively, some of at least one software module may be provided by an OS, and the others may be provided by a certain application.

Figure 22:
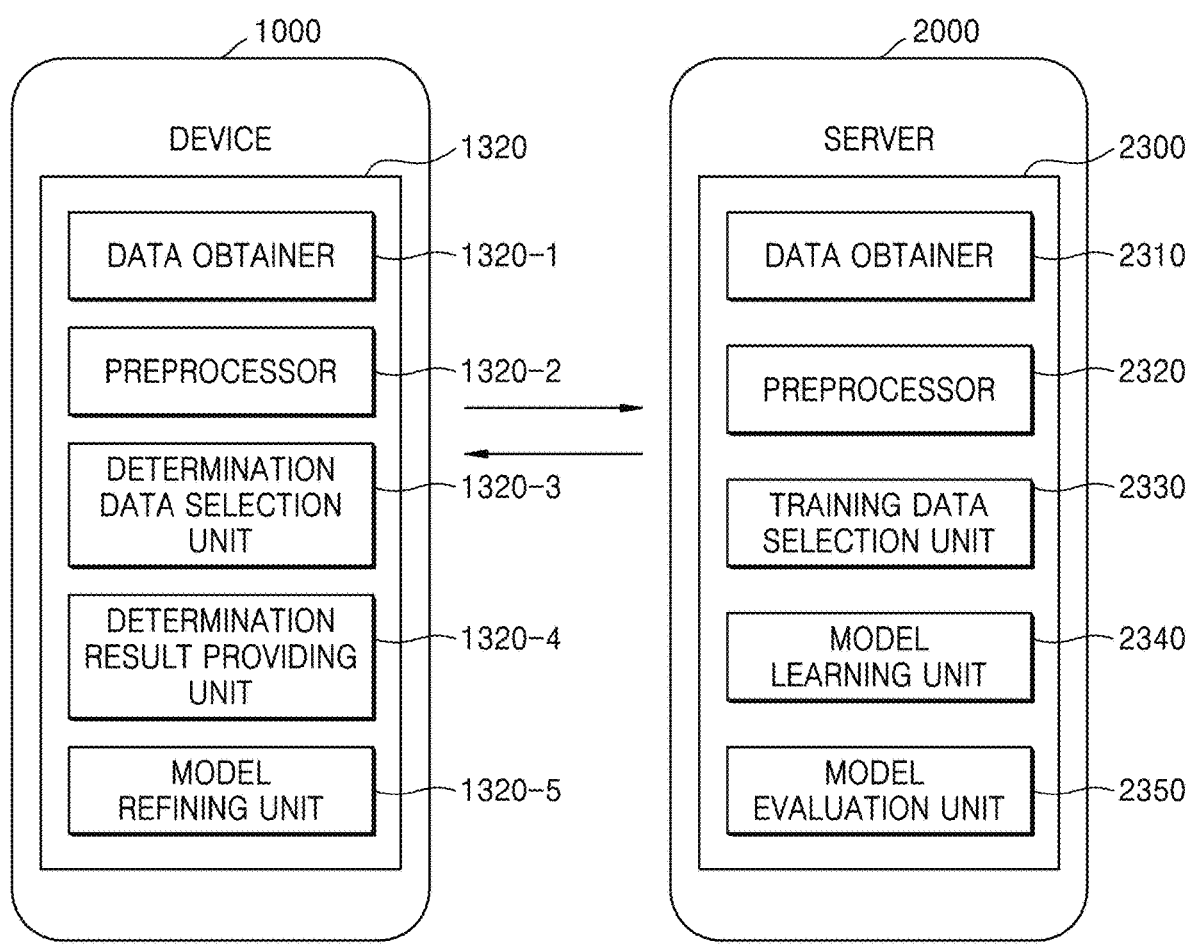
FIG. 22 is a diagram showing an example in which a device and a server learn and determine data by interacting with each other according to some embodiments.

FIG. 22 is a diagram showing an example in which the device 1000 and the server 2000 learn and determine data by interacting with each other according to some embodiments.

Referring to FIG. 22, the server 2000 may learn a reference for performing an operation of at least one of identification of a speech model of a user, identification of the content of a speech input, and identification of input music from certain data, and the device 1000 may perform an operation of at least one of identification of a speech model of a user, identification of the content of a speech input, and identification of input music from certain data, based on a learning result by the server 2000.

In this case, a model learning unit 2340 of the server 2000 may perform a function of the data learner 1310 shown in FIG. 19. The model learning unit 2340 of the server 2000 may learn a reference as to which data to use to perform an operation of at least one of identification of a speech model of a user, identification of the content of a speech input, and identification of input music from certain data. In addition, the model learning unit 2340 of the server 2000 may learn a reference for performing an operation of at least one of identification of a speech model of a user, identification of the content of a speech input, and identification of input music from certain data by using data. The model learning unit 2340 may obtain data to be used in learning and apply the obtained data to a data determination model described below, thereby learning a reference for performing an operation of at least one of identification of a speech model of a user, identification of the content of a speech input, and identification of input music from certain data.

In addition, the determination result providing unit 1320-4 of the device 1000 may perform an operation of at least one of identification of a speech model of a user, identification of the content of a speech input, and identification of input music from certain data by applying data selected by the determination data selection unit 1320-3 to a data determination model generated by the server 2000. For example, the determination result providing unit 1320-4 may transmit data selected by the determination data selection unit 1320-3 to the server 2000 and may request the server 2000 to apply the data selected by the determination data selection unit 1320-3 to a determination model and perform an operation of at least one of identification of a speech model of a user, identification of the content of a speech input, and identification of input music from certain data. In addition, the determination result providing unit 1320-4 may receive information for performing an operation of at least one of identification of a speech model of a user, identification of the content of a speech input, and identification of input music from certain data determined by the server 2000 from the server 2000.

Alternatively, the determination result providing unit 1320-4 of the device 1000 may receive a determination model generated by the server 2000 from the server 2000 and may perform an operation of at least one of identification of a speech model of a user, identification of the content of a speech input, and identification of input music from certain data by using the received determination model. In this case, the determination result providing unit 1320-4 of the device 1000 may perform an operation of at least one of identification of a speech model of a user, identification of the content of a speech input, and identification of input music from certain data by applying data selected by the determination data selection unit 1320-3 to a data determination model received from the server 2000.

In addition, the device 1000 and the server 2000 may effectively distribute and perform operations for learning of a data determination model and data determination, and thus, data processing may be efficiently performed to provide a service that meets the user's intention, and user privacy may be effectively protected.

Some embodiments may be implemented as an S/W program including instructions stored in computer-readable storage media.

For example, the computer, which is an apparatus capable of calling a stored instruction from a storage medium and performing an operation according to the disclosed embodiment according to the called instruction, may include a device according to the disclosed embodiments or an external server in communication with the device.

The computer-readable storage media may be provided in the form of non-transitory storage media. In this regard, 'non-transitory' merely means that the storage medium does not include a signal or a current and is tangible, and this term is not used to distinguish whether data is stored semi-permanently or temporarily in the storage medium. For example, non-transitory storage media may include not only readable storage media such as a CD, a DVD, a hard disk, a Blu-ray disk, a USB, an internal memory, a memory card, ROM, or RAM but also temporary storage media such as a register, a cache, a buffer, etc.

In addition, a method according to the disclosed embodiments may be provided as a computer program product.

The computer program product may include an S/W program, a computer-readable storage medium storing an S/W program, or a product traded between a seller and a buyer.

For example, the computer program product may include a product (e.g., a downloadable app) in the form of an S/W program that is electronically distributed through a device manufacturer or an electronic market (e.g., Google Play Store, App Store). For electronic distribution, at least a part of the S/W program may be stored in a storage medium or may be temporarily generated. In this case, the storage medium may be a storage medium of a server of a manufacturer or an electronic market or a relay server.

The invention claimed is:

1. A device for outputting sound, the device comprising:
a speaker configured to output the sound;
a memory storing one or more instructions; and
a processor configured to execute the one or more instructions to:
predict external sound which is expected to be received in the future from an external environment,
variably adjust sound to be output based on the predicted external sound, so that at least a portion of the predicted external sound is separated from the sound to be output in at least one of frequency band or time band,
output the adjusted sound through the speaker,
receive an external sound from the external environment, and
identify an input sound from the received external sound by separating the outputted adjusted sound from the received external sound.

2. The device of claim 1, wherein the processor is further configured to set at least one frequency band for filtering the sound to be output and control the speaker to output filtered sound based on the at least one frequency band, wherein the at least one frequency band is dynamically adjusted in a time band.

3. The device of claim 2, wherein the processor is further configured to set the at least one frequency band for filtering the sound to be output by setting a number of the at least one frequency band and setting at least one of a width and a center frequency of the at least one frequency band.

4. The device of claim 1, wherein the sound to be output comprises music sound comprising at least one musical instrument component, wherein the processor is further configured to adjust, from among the at least one musical instrument component, at least one musical instrument component in at least one of frequency band and time band.

5. The device of claim 1,
wherein the predicted external sound comprises a first speech to be made by a user,
wherein the processor is further configured to obtain a second speech made by the user and predict the first speech based on the obtained second speech.

6. The device of claim 1,
wherein the predicted external sound comprises first music sound, and
wherein the processor is further configured to obtain second music sound from the external environment, identify already published music comprising the second music sound, based on the second music sound, and predict the first music sound, based on the identified music.

7. The device of claim 6, wherein the processor is further configured to obtain a database comprising information about at least one piece of music, match the information about at least one piece of music comprised in the database and the obtained second music sound with each other, and identify the published music, based on a result of the matching.

8. The device of claim 1,
wherein the sound to be output from the speaker comprises speech sound and music sound, and
wherein the processor is further configured to separate at least a portion of the predicted external sound, the speech sound, and the music sound from one another in at least one of frequency band and time band.

9. The device of claim 8, wherein the processor is further configured to separate at least a portion of the predicted external sound, the speech sound, and the music sound from one another in at least one of frequency band and time band by applying different filters to the speech sound and the music sound from each other.

10. A method of outputting sound by using a device, the method comprising:
predicting external sound which is expected to be received in the future from an external environment;

variably adjusting sound to be output based on the predicted external sound, so that at least a portion of the predicted external sound is separated from the sound to be output in at least one of frequency band or time band;

outputting the adjusted sound;

receiving an external sound from the external environment; and identifying an input sound from the received external sound by separating the outputted adjusted sound from the received external sound.

11. The method of claim 10, wherein the variably adjusting sound to be output comprises:

setting at least one frequency band for filtering the sound to be output; and outputting filtered sound, based on the at least one frequency band, wherein the at least one frequency band is dynamically adjusted in a time band.

12. The method of claim 11, wherein the setting of the at least one frequency band for filtering the sound to be output comprises:

setting a number of the at least one frequency band; and setting at least one of a width and a center frequency of the at least one frequency band.

13. The method of claim 10, wherein the sound to be output comprises music sound comprising at least one musical instrument component, wherein the variably adjusting sound to be output comprises adjusting, from among the at least one musical instrument component, at least one musical instrument component in at least one of frequency band and time band.

\* \* \* \* \*